United States Patent
Gilad et al.

(10) Patent No.: US 12,495,049 B2
(45) Date of Patent: Dec. 9, 2025

(54) TECHNIQUES FOR UTILIZING A SENSOR IN DETECTING PRIVILEGE ESCALATION

(71) Applicant: Wiz, Inc., New York, NY (US)

(72) Inventors: Itamar Gilad, Tel Aviv (IL); Aviel Fogel, Tel Aviv (IL); Udi Reitblat, Tel Aviv (IL); Alon Schindel, Tel Aviv (IL); Ami Luttwak, Binyamina (IL); Roy Reznik, Tel Aviv (IL); Yinon Costica, Tel Aviv (IL)

(73) Assignee: Wiz, Inc., New York, NY (US)

( * ) Notice: Subject to any disclaimer, the term of this patent is extended or adjusted under 35 U.S.C. 154(b) by 242 days.

(21) Appl. No.: 18/361,341

(22) Filed: Jul. 28, 2023

(65) Prior Publication Data

US 2023/0388325 A1 Nov. 30, 2023

Related U.S. Application Data

(63) Continuation-in-part of application No. 18/162,412, filed on Jan. 31, 2023, and a continuation-in-part of
(Continued)

(51) Int. Cl.
*H04L 9/40* (2022.01)
*G06F 21/53* (2013.01)
*G06F 21/55* (2013.01)

(52) U.S. Cl.
CPC .......... *H04L 63/1416* (2013.01); *G06F 21/53* (2013.01); *G06F 21/554* (2013.01); *H04L 63/1425* (2013.01); *G06F 2221/032* (2013.01)

(58) Field of Classification Search
CPC . H04L 63/1416; H04L 63/1425; H04L 63/20; G06F 21/53; G06F 21/554
See application file for complete search history.

(56) References Cited

U.S. PATENT DOCUMENTS 6,910,132 B1 6/2005 Bhattacharya
7,627,652 B1 12/2009 Commons et al.
(Continued)

FOREIGN PATENT DOCUMENTS

CN 106462439 A 2/2017
CN 109240804 A 1/2019
(Continued)

OTHER PUBLICATIONS

Chang, Bing et al. MobiCeal: Towards Secure and Practical Plausibly Deniable Encryption on Mobile Devices. 2018 48th Annual IEEE/IFIP International Conference on Dependable Systems and Networks (DSN). https://ieeexplore.ieee.org/stamp/stamp.jsp?tp=&arnumber=8416506 (Year: 2018).
(Continued)

*Primary Examiner* — Ali S Abyaneh
(74) *Attorney, Agent, or Firm* — M&B IP Analysts, LLC

(57) ABSTRACT

A system and method for detecting privilege escalation on a resource deployed in a computing environment is disclosed. The method includes: configuring the resource to deploy thereon a sensor, the sensor configured to listen on a data link layer of the resource for an event; receiving from the sensor a permission-based event based on a first actor, the permission-based event indicating a first permission set of the first actor; querying a database to detect a second permission set of the first actor; detecting that the first permission set includes a permission which is not in the second permission set; determining that the resource is involved in a privilege escalation event in response to detecting that the first permission set includes a permission which is not in the second permission set; and initiating a mitigation action in response to the determined privilege escalation event.

15 Claims, 7 Drawing Sheets

Related U.S. Application Data application No. 18/045,046, filed on Oct. 7, 2022, now Pat. No. 11,841,945.

(60) Provisional application No. 63/267,368, filed on Jan. 31, 2022.

(56) References Cited

U.S. PATENT DOCUMENTS

| | | |
|---|---|---|
| 7,784,101 B2 | 8/2010 | Verbowski et al. |
| 8,104,075 B2 | 1/2012 | Spector |
| 8,200,965 B2 | 6/2012 | Fujibayashi et al. |
| 8,320,558 B1 | 11/2012 | Zea |
| 8,352,431 B1 | 1/2013 | Protopopov et al. |
| 8,412,688 B1 | 4/2013 | Armangau et al. |
| 8,413,239 B2 | 4/2013 | Sutton |
| 8,417,967 B2 | 4/2013 | Foster et al. |
| 8,499,354 B1 | 7/2013 | Satish et al. |
| 8,595,822 B2 | 11/2013 | Schrecker et al. |
| 8,701,200 B2 | 4/2014 | Naldurg et al. |
| 8,789,049 B2 | 7/2014 | Hutchins et al. |
| 8,813,234 B1 | 8/2014 | Bowers et al. |
| 8,898,481 B1 | 11/2014 | Osburn, III et al. |
| 8,904,525 B1 | 12/2014 | Hodgman et al. |
| 8,914,406 B1 | 12/2014 | Haugsnes |
| 9,009,836 B1 | 4/2015 | Yarykin et al. |
| 9,094,379 B1 | 7/2015 | Miller |
| 9,119,017 B2 | 8/2015 | Sinha |
| 9,165,142 B1 | 10/2015 | Sanders et al. |
| 9,172,621 B1 | 10/2015 | Dippenaar |
| 9,185,136 B2 | 11/2015 | Dulkin et al. |
| 9,330,273 B2 | 5/2016 | Khetawat et al. |
| 9,369,433 B1 | 6/2016 | Paul |
| 9,419,996 B2 | 8/2016 | Porat |
| 9,438,634 B1 | 9/2016 | Ross et al. |
| 9,467,473 B2 | 10/2016 | Jayaraman |
| 9,544,327 B1 | 1/2017 | Sharma et al. |
| 9,563,385 B1 | 2/2017 | Kowalski et al. |
| 9,569,328 B2 | 2/2017 | Pavlov et al. |
| 9,582,662 B1 | 2/2017 | Messick et al. |
| 9,596,235 B2 | 3/2017 | Badam et al. |
| 9,607,104 B1 | 3/2017 | Turner et al. |
| 9,621,595 B2 | 4/2017 | Lian et al. |
| 9,646,172 B1 | 5/2017 | Hahn |
| 9,661,009 B1 | 5/2017 | Karandikar et al. |
| 9,665,465 B1 | 5/2017 | Jain et al. |
| 9,672,355 B2 | 6/2017 | Titonis et al. |
| 9,712,503 B1 | 7/2017 | Ahmed |
| 9,892,261 B2 | 2/2018 | Joram et al. |
| 9,992,186 B1 | 6/2018 | Drozd et al. |
| 10,002,247 B2 | 6/2018 | Suarez et al. |
| 10,009,337 B1 | 6/2018 | Fischer et al. |
| 10,032,032 B2 | 7/2018 | Suarez et al. |
| 10,044,723 B1 | 8/2018 | Fischer et al. |
| 10,135,826 B2 | 11/2018 | Reddy |
| 10,205,638 B1 | 2/2019 | Angrish et al. |
| 10,229,125 B2 | 3/2019 | Goodman et al. |
| 10,255,370 B2 | 4/2019 | Carpenter et al. |
| 10,360,025 B2 | 7/2019 | Foskett et al. |
| 10,412,103 B2 | 9/2019 | Haugsnes |
| 10,412,109 B2 | 9/2019 | Loureiro et al. |
| 10,459,664 B1 | 10/2019 | Dreier et al. |
| 10,509,909 B2 | 12/2019 | Andriani |
| 10,536,471 B1 | 1/2020 | Derbeko et al. |
| 10,540,499 B2 | 1/2020 | Wailly et al. |
| 10,552,610 B1 | 2/2020 | Vashisht et al. |
| 10,554,507 B1 | 2/2020 | Siddiqui et al. |
| 10,567,468 B2 | 2/2020 | Perlmutter |
| 10,572,226 B2 | 2/2020 | Biskup et al. |
| 10,574,675 B2 | 2/2020 | Peppe et al. |
| 10,623,386 B1 | 4/2020 | Bernat et al. |
| 10,630,642 B2 | 4/2020 | Clark et al. |
| 10,664,619 B1 | 5/2020 | Marelas |
| 10,691,636 B2 | 6/2020 | Tabaaloute et al. |
| 10,721,260 B1 | 7/2020 | Schlarp et al. |
| 10,725,775 B2 | 7/2020 | Suarez et al. |
| 10,728,252 B2 | 7/2020 | Desai et al. |
| 10,735,430 B1 | 8/2020 | Stoler |
| 10,735,442 B1 | 8/2020 | Swackhamer |
| 10,791,138 B1 | 9/2020 | Siddiqui et al. |
| 10,803,188 B1 | 10/2020 | Rajput et al. |
| 10,831,898 B1 | 11/2020 | Wagner |
| 10,887,333 B1 | 1/2021 | Pereira et al. |
| 10,915,626 B2 | 2/2021 | Tang |
| 10,924,503 B1 | 2/2021 | Pereira et al. |
| 10,949,406 B1 | 3/2021 | Calvo et al. |
| 10,972,484 B1 | 4/2021 | Swackhamer |
| 10,984,098 B2 * | 4/2021 | Lavi ................. G06F 21/54 |
| 10,997,293 B2 | 5/2021 | Wiest et al. |
| 11,005,860 B1 | 5/2021 | Glyer et al. |
| 11,016,954 B1 | 5/2021 | Babocichin et al. |
| 11,044,118 B1 | 6/2021 | Reed et al. |
| 11,055,414 B2 | 7/2021 | Claes |
| 11,064,032 B1 | 7/2021 | Yang et al. |
| 11,099,976 B2 | 8/2021 | Khakare et al. |
| 11,102,231 B2 | 8/2021 | Kraning et al. |
| 11,165,652 B1 | 11/2021 | Byrne |
| 11,245,730 B2 | 2/2022 | Bailey |
| 11,258,825 B1 | 2/2022 | Yang et al. |
| 11,271,961 B1 | 3/2022 | Berger |
| 11,334,670 B2 | 5/2022 | Franco et al. |
| 11,336,555 B2 | 5/2022 | Soh et al. |
| 11,366,897 B1 | 6/2022 | Ramanathan et al. |
| 11,388,183 B2 | 7/2022 | Hoopes et al. |
| 11,397,808 B1 | 7/2022 | Prabhu et al. |
| 11,405,426 B2 | 8/2022 | Nguyen |
| 11,418,528 B2 | 8/2022 | Deardorff et al. |
| 11,442,989 B2 | 9/2022 | Dvinov et al. |
| 11,444,974 B1 | 9/2022 | Shakhzadyan |
| 11,483,317 B1 * | 10/2022 | Bolignano ............ G06F 21/577 |
| 11,496,498 B2 | 11/2022 | Wright et al. |
| 11,496,519 B1 | 11/2022 | Gupta et al. |
| 11,503,063 B2 | 11/2022 | Rao |
| 11,507,672 B1 | 11/2022 | Pagnozzi et al. |
| 11,509,658 B1 | 11/2022 | Kulkarni |
| 11,516,222 B1 | 11/2022 | Srinivasan et al. |
| 11,520,907 B1 | 12/2022 | Borowiec et al. |
| 11,546,360 B2 | 1/2023 | Woodford et al. |
| 11,556,659 B1 | 1/2023 | Kumar et al. |
| 11,558,401 B1 | 1/2023 | Vashisht et al. |
| 11,558,414 B1 | 1/2023 | Nguyen |
| 11,558,423 B2 | 1/2023 | Gordon et al. |
| 11,567,751 B2 | 1/2023 | Cosentino et al. |
| 11,570,090 B2 | 1/2023 | Shen et al. |
| 11,575,696 B1 | 2/2023 | Ithal et al. |
| 11,593,485 B1 | 2/2023 | Briliauskas et al. |
| 11,606,378 B1 | 3/2023 | Delpont et al. |
| 11,614,956 B2 | 3/2023 | Tsirkin et al. |
| 11,645,390 B2 | 5/2023 | Vijayvargiya et al. |
| 11,651,055 B2 | 5/2023 | Saillet et al. |
| 11,662,928 B1 | 5/2023 | Kumar et al. |
| 11,663,340 B2 | 5/2023 | Wu et al. |
| 11,669,386 B1 | 6/2023 | Abrol |
| 11,695,785 B2 | 7/2023 | Ithal et al. |
| 11,700,233 B2 | 7/2023 | St. Pierre |
| 11,720,685 B2 | 8/2023 | Gwilliams |
| 11,750,566 B1 | 9/2023 | Montilla Lugo |
| 11,757,844 B2 | 9/2023 | Xiao |
| 11,770,398 B1 | 9/2023 | Erlingsson |
| 11,792,284 B1 | 10/2023 | Nanduri |
| 11,799,874 B1 | 10/2023 | Lichtenstein et al. |
| 11,803,766 B1 | 10/2023 | Srinivasan |
| 11,831,670 B1 | 11/2023 | Molls et al. |
| 11,836,250 B2 * | 12/2023 | Grossman ............ G06F 21/554 |
| 11,841,945 B1 | 12/2023 | Fogel |
| 11,902,282 B2 | 2/2024 | Ghiold et al. |
| 11,914,707 B1 | 2/2024 | Ramanathan et al. |
| 11,922,220 B2 | 3/2024 | Haghighat et al. |
| 11,936,785 B1 | 3/2024 | Shemesh et al. |
| 11,960,609 B2 | 4/2024 | Gokhman et al. |
| 11,973,770 B1 | 4/2024 | Miran et al. |
| 11,991,216 B1 | 5/2024 | Venkatachari |
| 12,003,541 B2 | 6/2024 | Shulman et al. |
| 12,019,770 B2 | 6/2024 | Nilsson et al. |
| 12,050,696 B2 | 7/2024 | Pieno et al. |

(56) References Cited

U.S. PATENT DOCUMENTS

| | | |
|---|---|---|
| 12,058,177 B2 | 8/2024 | Crabtree et al. |
| 12,063,305 B2 | 8/2024 | Ip et al. |
| 12,164,652 B1 * | 12/2024 | Li .................... G06F 21/6218 |
| 12,166,785 B2 | 12/2024 | Yellapragada et al. |
| 2002/0133586 A1 | 9/2002 | Shanklin et al. |
| 2002/0184486 A1 | 12/2002 | Kershenbaum et al. |
| 2003/0188194 A1 | 10/2003 | Currie et al. |
| 2003/0217039 A1 | 11/2003 | Kurtz et al. |
| 2004/0054681 A1 | 3/2004 | Pitts |
| 2005/0050365 A1 | 3/2005 | Seki et al. |
| 2005/0071630 A1 | 3/2005 | Thornton et al. |
| 2005/0251863 A1 | 11/2005 | Sima |
| 2005/0283645 A1 | 12/2005 | Turner et al. |
| 2007/0006304 A1 | 1/2007 | Kramer et al. |
| 2007/0271360 A1 | 11/2007 | Sahita et al. |
| 2008/0075283 A1 | 3/2008 | Takahashi |
| 2008/0221833 A1 | 9/2008 | Brown et al. |
| 2008/0307020 A1 | 12/2008 | Ko et al. |
| 2009/0106256 A1 | 4/2009 | Safari et al. |
| 2009/0271863 A1 | 10/2009 | Govindavajhala et al. |
| 2010/0242082 A1 | 9/2010 | Keene et al. |
| 2010/0263049 A1 | 10/2010 | Cross et al. |
| 2010/0274970 A1 | 10/2010 | Treuhaft et al. |
| 2010/0281275 A1 | 11/2010 | Lee et al. |
| 2011/0035802 A1 | 2/2011 | Arajujo, Jr. et al. |
| 2011/0055361 A1 | 3/2011 | Dehaan |
| 2011/0276806 A1 | 11/2011 | Casper et al. |
| 2012/0110651 A1 | 5/2012 | Van Biljon et al. |
| 2012/0255003 A1 | 10/2012 | Sallam |
| 2012/0297206 A1 | 11/2012 | Nord et al. |
| 2012/0311696 A1 | 12/2012 | Datsenko et al. |
| 2013/0054890 A1 | 2/2013 | Desai et al. |
| 2013/0124669 A1 | 5/2013 | Anderson et al. |
| 2013/0160119 A1 | 6/2013 | Sartin |
| 2013/0160129 A1 | 6/2013 | Sartin |
| 2014/0096134 A1 | 4/2014 | Barak |
| 2014/0115578 A1 | 4/2014 | Cooper et al. |
| 2014/0237537 A1 | 8/2014 | Manmohan |
| 2014/0317677 A1 | 10/2014 | Vaidya |
| 2014/0337613 A1 | 11/2014 | Martini |
| 2015/0033305 A1 | 1/2015 | Shear |
| 2015/0055647 A1 | 2/2015 | Roberts |
| 2015/0058993 A1 | 2/2015 | Choi et al. |
| 2015/0067850 A1 | 3/2015 | Baikalov |
| 2015/0095995 A1 | 4/2015 | Bhalerao |
| 2015/0150072 A1 | 5/2015 | Doctor et al. |
| 2015/0161394 A1 | 6/2015 | Ferragut et al. |
| 2015/0163192 A1 | 6/2015 | Jain |
| 2015/0172321 A1 | 6/2015 | Kirti et al. |
| 2015/0254364 A1 | 9/2015 | Piduri et al. |
| 2015/0310215 A1 | 10/2015 | McBride et al. |
| 2015/0319160 A1 | 11/2015 | Ferguson et al. |
| 2016/0063037 A1 | 3/2016 | Savkli |
| 2016/0078231 A1 | 3/2016 | Bach et al. |
| 2016/0103669 A1 | 4/2016 | Gamage et al. |
| 2016/0105454 A1 | 4/2016 | Li |
| 2016/0140352 A1 | 5/2016 | Nickolov |
| 2016/0156664 A1 | 6/2016 | Nagaratnam |
| 2016/0224600 A1 | 8/2016 | Munk |
| 2016/0299708 A1 | 10/2016 | Yang et al. |
| 2016/0366185 A1 | 12/2016 | Lee et al. |
| 2017/0026416 A1 | 1/2017 | Carpenter et al. |
| 2017/0034198 A1 | 2/2017 | Powers et al. |
| 2017/0070506 A1 | 3/2017 | Reddy |
| 2017/0104755 A1 | 4/2017 | Arregoces |
| 2017/0111384 A1 | 4/2017 | Loureiro et al. |
| 2017/0126712 A1 | 5/2017 | Crabtree et al. |
| 2017/0163650 A1 | 6/2017 | Seigel et al. |
| 2017/0180421 A1 | 6/2017 | Shieh et al. |
| 2017/0185784 A1 | 6/2017 | Madou |
| 2017/0187686 A1 | 6/2017 | Shaikh et al. |
| 2017/0187743 A1 | 6/2017 | Madou |
| 2017/0200122 A1 | 7/2017 | Edson et al. |
| 2017/0223024 A1 | 8/2017 | Desai |
| 2017/0230179 A1 | 8/2017 | Mannan et al. |
| 2017/0237560 A1 | 8/2017 | Mueller et al. |
| 2017/0257347 A1 | 9/2017 | Yan |
| 2017/0285978 A1 | 10/2017 | Manasse |
| 2017/0300690 A1 | 10/2017 | Ladnai et al. |
| 2017/0374136 A1 | 12/2017 | Ringdahl |
| 2018/0004950 A1 | 1/2018 | Gupta et al. |
| 2018/0026995 A1 | 1/2018 | Dufour et al. |
| 2018/0027009 A1 | 1/2018 | Santos |
| 2018/0063290 A1 | 3/2018 | Yang et al. |
| 2018/0081640 A1 | 3/2018 | Collins |
| 2018/0083987 A1 | 3/2018 | Kislitsin |
| 2018/0101622 A1 | 4/2018 | Helvik et al. |
| 2018/0137174 A1 | 5/2018 | Cahana et al. |
| 2018/0150412 A1 | 5/2018 | Manasse |
| 2018/0159882 A1 | 6/2018 | Brill |
| 2018/0181310 A1 | 6/2018 | Feinberg et al. |
| 2018/0191726 A1 | 7/2018 | Luukkala |
| 2018/0219888 A1 | 8/2018 | Apostolopoulos |
| 2018/0234459 A1 | 8/2018 | Kung |
| 2018/0239902 A1 | 8/2018 | Godard |
| 2018/0248902 A1 | 8/2018 | Dnilã-Dumitrescu et al. |
| 2018/0260566 A1 | 9/2018 | Chaganti et al. |
| 2018/0270268 A1 | 9/2018 | Gorodissky et al. |
| 2018/0278639 A1 | 9/2018 | Bernstein et al. |
| 2018/0288129 A1 | 10/2018 | Joshi et al. |
| 2018/0307736 A1 | 10/2018 | Balakrishnan et al. |
| 2018/0309747 A1 | 10/2018 | Sweet et al. |
| 2018/0321993 A1 | 11/2018 | McClory |
| 2018/0341768 A1 | 11/2018 | Marshall et al. |
| 2018/0349612 A1 | 12/2018 | Harel et al. |
| 2018/0359058 A1 | 12/2018 | Kurian |
| 2018/0359059 A1 | 12/2018 | Kurian |
| 2018/0367548 A1 | 12/2018 | Stokes, III et al. |
| 2019/0007271 A1 | 1/2019 | Rickards et al. |
| 2019/0018961 A1 | 1/2019 | Kostyushko et al. |
| 2019/0043201 A1 | 2/2019 | Strong et al. |
| 2019/0058722 A1 | 2/2019 | Levin et al. |
| 2019/0068617 A1 | 2/2019 | Coleman |
| 2019/0068627 A1 | 2/2019 | Thampy |
| 2019/0081963 A1 | 3/2019 | Waghorn |
| 2019/0089720 A1 | 3/2019 | Aditham et al. |
| 2019/0095626 A1 | 3/2019 | Mohan |
| 2019/0104140 A1 | 4/2019 | Gordeychik et al. |
| 2019/0116111 A1 | 4/2019 | Izard et al. |
| 2019/0121986 A1 | 4/2019 | Stopel et al. |
| 2019/0132350 A1 | 5/2019 | Smith et al. |
| 2019/0149604 A1 | 5/2019 | Jahr |
| 2019/0166129 A1 | 5/2019 | Gaetjen et al. |
| 2019/0171811 A1 | 6/2019 | Daniel et al. |
| 2019/0191417 A1 | 6/2019 | Baldemair et al. |
| 2019/0205267 A1 | 7/2019 | Richey et al. |
| 2019/0207966 A1 | 7/2019 | Vashisht et al. |
| 2019/0220298 A1 | 7/2019 | Jiao et al. |
| 2019/0220575 A1 | 7/2019 | Boudreau et al. |
| 2019/0229915 A1 | 7/2019 | Digiambattista et al. |
| 2019/0235900 A1 | 8/2019 | Singh et al. |
| 2019/0236409 A1 | 8/2019 | Van Der Stockt et al. |
| 2019/0245883 A1 | 8/2019 | Gorodissky et al. |
| 2019/0260764 A1 | 8/2019 | Humphrey et al. |
| 2019/0266508 A1 | 8/2019 | Bunyk et al. |
| 2019/0278928 A1 | 9/2019 | Rungta et al. |
| 2019/0327258 A1 | 10/2019 | Choi et al. |
| 2019/0327271 A1 | 10/2019 | Saxena et al. |
| 2019/0334715 A1 | 10/2019 | Gray |
| 2019/0354675 A1 | 11/2019 | Gan et al. |
| 2019/0377988 A1 | 12/2019 | Qi et al. |
| 2020/0007314 A1 | 1/2020 | Vouk et al. |
| 2020/0007569 A1 | 1/2020 | Dodge et al. |
| 2020/0012818 A1 | 1/2020 | Levin et al. |
| 2020/0021994 A1 | 1/2020 | Ranjbar et al. |
| 2020/0028862 A1 | 1/2020 | Lin |
| 2020/0044916 A1 | 2/2020 | Kaufman et al. |
| 2020/0050440 A1 | 2/2020 | Chuppala et al. |
| 2020/0074360 A1 | 3/2020 | Humphries et al. |
| 2020/0082094 A1 | 3/2020 | McAllister et al. |
| 2020/0106782 A1 | 4/2020 | Sion |
| 2020/0117434 A1 | 4/2020 | Biskup et al. |
| 2020/0125352 A1 | 4/2020 | Kannan |
| 2020/0137097 A1 | 4/2020 | Zimmermann et al. |

(56) References Cited

U.S. PATENT DOCUMENTS

| | | |
|---|---|---|
| 2020/0137125 A1 | 4/2020 | Patnala et al. |
| 2020/0145405 A1 | 5/2020 | Bosch et al. |
| 2020/0175171 A1 | 6/2020 | Rieger et al. |
| 2020/0183719 A1 | 6/2020 | Shetty et al. |
| 2020/0186416 A1 | 6/2020 | Hashimoto et al. |
| 2020/0244678 A1 | 7/2020 | Shua |
| 2020/0244692 A1 | 7/2020 | Shua |
| 2020/0259852 A1 | 8/2020 | Wolff et al. |
| 2020/0320189 A1 | 10/2020 | Zhang et al. |
| 2020/0320845 A1 | 10/2020 | Livny et al. |
| 2020/0336489 A1 | 10/2020 | Wuest et al. |
| 2020/0382556 A1 | 12/2020 | Woolward et al. |
| 2020/0387357 A1 | 12/2020 | Mathon et al. |
| 2020/0389431 A1 | 12/2020 | St. Pierre |
| 2020/0389469 A1 | 12/2020 | Litichever et al. |
| 2020/0409741 A1 | 12/2020 | Dornemann et al. |
| 2021/0006574 A1 | 1/2021 | Venter et al. |
| 2021/0014265 A1 | 1/2021 | Hadar et al. |
| 2021/0026932 A1 | 1/2021 | Boudreau et al. |
| 2021/0042263 A1 | 2/2021 | Zdornov et al. |
| 2021/0056548 A1 | 2/2021 | Monica et al. |
| 2021/0089662 A1 | 3/2021 | Muniswamy-Reddy et al. |
| 2021/0105304 A1 | 4/2021 | Kraning et al. |
| 2021/0144517 A1 | 5/2021 | Guim Bernat et al. |
| 2021/0149788 A1 | 5/2021 | Downie |
| 2021/0158835 A1 | 5/2021 | Hill et al. |
| 2021/0168150 A1 | 6/2021 | Ross et al. |
| 2021/0173939 A1 | 6/2021 | Kotler et al. |
| 2021/0176123 A1 | 6/2021 | Plamondon |
| 2021/0176164 A1 | 6/2021 | Kung et al. |
| 2021/0185073 A1 | 6/2021 | Ewaida et al. |
| 2021/0194678 A1 | 6/2021 | Schindewolf et al. |
| 2021/0200881 A1 | 7/2021 | Joshi et al. |
| 2021/0203684 A1 | 7/2021 | Maor et al. |
| 2021/0203761 A1 | 7/2021 | Ahn et al. |
| 2021/0211453 A1 | 7/2021 | Cooney |
| 2021/0216591 A1 | 7/2021 | Dvinov et al. |
| 2021/0216630 A1 | 7/2021 | Karr |
| 2021/0218567 A1 | 7/2021 | Richards et al. |
| 2021/0226812 A1 | 7/2021 | Park |
| 2021/0226928 A1 | 7/2021 | Crabtree et al. |
| 2021/0232344 A1 | 7/2021 | Corrie |
| 2021/0234889 A1 | 7/2021 | Burle et al. |
| 2021/0248443 A1 | 8/2021 | Shu et al. |
| 2021/0263802 A1 | 8/2021 | Gottemukkula et al. |
| 2021/0273953 A1 | 9/2021 | Fellows et al. |
| 2021/0297447 A1 | 9/2021 | Crabtree et al. |
| 2021/0306416 A1 | 9/2021 | Mukhopadhyay et al. |
| 2021/0314342 A1 | 10/2021 | Oberg |
| 2021/0320794 A1 | 10/2021 | Auh et al. |
| 2021/0326883 A1 | 10/2021 | Misra et al. |
| 2021/0329019 A1 | 10/2021 | Shua et al. |
| 2021/0334386 A1 | 10/2021 | AlGhamdi et al. |
| 2021/0357246 A1 | 11/2021 | Kumar et al. |
| 2021/0360032 A1 | 11/2021 | Crabtree et al. |
| 2021/0368045 A1 | 11/2021 | Verma |
| 2021/0382995 A1 | 12/2021 | Massiglia et al. |
| 2021/0382997 A1 | 12/2021 | Yi et al. |
| 2021/0400071 A1 | 12/2021 | Ray et al. |
| 2021/0406365 A1 | 12/2021 | Neil et al. |
| 2021/0409486 A1 | 12/2021 | Martinez |
| 2022/0004410 A1 | 1/2022 | Chen |
| 2022/0012771 A1 | 1/2022 | Gustafson |
| 2022/0030020 A1 | 1/2022 | Huffman |
| 2022/0035862 A1 | 2/2022 | Ben-Natan |
| 2022/0035905 A1 | 2/2022 | Lu et al. |
| 2022/0036302 A1 | 2/2022 | Cella et al. |
| 2022/0053011 A1 | 2/2022 | Rao et al. |
| 2022/0060497 A1 | 2/2022 | Crabtree et al. |
| 2022/0086173 A1 | 3/2022 | Yavo et al. |
| 2022/0100869 A1 | 3/2022 | Berger et al. |
| 2022/0131888 A1 | 4/2022 | Kanso |
| 2022/0138512 A1 | 5/2022 | Saillet et al. |
| 2022/0156396 A1 | 5/2022 | Bednash et al. |
| 2022/0164111 A1 | 5/2022 | Yang et al. |
| 2022/0179964 A1 | 6/2022 | Qiao et al. |
| 2022/0182403 A1 | 6/2022 | Mistry |
| 2022/0188273 A1 | 6/2022 | Koorapati et al. |
| 2022/0188689 A1 | 6/2022 | Gunawardana et al. |
| 2022/0197926 A1 | 6/2022 | Passey et al. |
| 2022/0210053 A1 | 6/2022 | Du |
| 2022/0215101 A1 | 7/2022 | Rioux et al. |
| 2022/0232024 A1 | 7/2022 | Kapoor |
| 2022/0232042 A1 | 7/2022 | Crabtree et al. |
| 2022/0247791 A1 | 8/2022 | Duminuco et al. |
| 2022/0263656 A1 | 8/2022 | Moore |
| 2022/0284362 A1 | 9/2022 | Bellinger et al. |
| 2022/0309166 A1 | 9/2022 | Shenoy et al. |
| 2022/0326861 A1 | 10/2022 | Shachar et al. |
| 2022/0326941 A1 | 10/2022 | Nelson et al. |
| 2022/0327119 A1 | 10/2022 | Gasper et al. |
| 2022/0335340 A1 | 10/2022 | Moustafa et al. |
| 2022/0342690 A1 | 10/2022 | Shua |
| 2022/0342997 A1 | 10/2022 | Watanabe et al. |
| 2022/0345480 A1 | 10/2022 | Shua |
| 2022/0345481 A1 | 10/2022 | Shua |
| 2022/0350931 A1 | 11/2022 | Shua |
| 2022/0357992 A1 | 11/2022 | Karpovsky |
| 2022/0358233 A1 | 11/2022 | Thakur et al. |
| 2022/0360958 A1 | 11/2022 | Cui et al. |
| 2022/0374519 A1 | 11/2022 | Botelho et al. |
| 2022/0382784 A1 | 12/2022 | Osuala et al. |
| 2022/0400128 A1 | 12/2022 | Kfir et al. |
| 2022/0407841 A1 | 12/2022 | Karpowicz |
| 2022/0407889 A1 | 12/2022 | Narigapalli et al. |
| 2022/0413879 A1 | 12/2022 | Passey et al. |
| 2022/0414103 A1 | 12/2022 | Upadhyay et al. |
| 2022/0417011 A1 | 12/2022 | Shua |
| 2022/0417219 A1 | 12/2022 | Sheriff |
| 2023/0007014 A1 | 1/2023 | Narayan |
| 2023/0011957 A1 | 1/2023 | Panse et al. |
| 2023/0019015 A1* | 1/2023 | Ahmed ............... G06N 20/00 |
| 2023/0027210 A1 | 1/2023 | Shelton, IV et al. |
| 2023/0032686 A1 | 2/2023 | Williams et al. |
| 2023/0036145 A1 | 2/2023 | Ramachandran et al. |
| 2023/0040635 A1 | 2/2023 | Narayan |
| 2023/0075355 A1 | 3/2023 | Twigg |
| 2023/0087093 A1 | 3/2023 | Ithal et al. |
| 2023/0095756 A1 | 3/2023 | Wilkinson et al. |
| 2023/0102103 A1 | 3/2023 | Mazumder et al. |
| 2023/0110080 A1 | 4/2023 | Hen |
| 2023/0114821 A1 | 4/2023 | Thomas et al. |
| 2023/0123477 A1 | 4/2023 | Luttwak et al. |
| 2023/0125134 A1 | 4/2023 | Raleigh et al. |
| 2023/0134674 A1 | 5/2023 | Quinn et al. |
| 2023/0135240 A1 | 5/2023 | Cody et al. |
| 2023/0136839 A1 | 5/2023 | Sundararajan et al. |
| 2023/0161614 A1 | 5/2023 | Herzberg et al. |
| 2023/0161870 A1 | 5/2023 | Herzberg et al. |
| 2023/0164148 A1 | 5/2023 | Narayan |
| 2023/0164164 A1 | 5/2023 | Herzberg et al. |
| 2023/0164182 A1 | 5/2023 | Kothari et al. |
| 2023/0169165 A1 | 6/2023 | Williams et al. |
| 2023/0171271 A1 | 6/2023 | Williams et al. |
| 2023/0192418 A1 | 6/2023 | Horowitz et al. |
| 2023/0208855 A1 | 6/2023 | Sheriff et al. |
| 2023/0208870 A1 | 6/2023 | Yellapragada et al. |
| 2023/0224319 A1 | 7/2023 | Isoyama et al. |
| 2023/0229764 A1 | 7/2023 | Vohra et al. |
| 2023/0231867 A1 | 7/2023 | Rampura Venkatachar |
| 2023/0237068 A1 | 7/2023 | Sillifant et al. |
| 2023/0254330 A1 | 8/2023 | Singh |
| 2023/0297666 A1 | 9/2023 | Atamli et al. |
| 2023/0325814 A1 | 10/2023 | Vijayan et al. |
| 2023/0336550 A1 | 10/2023 | Lidgi et al. |
| 2023/0336578 A1 | 10/2023 | Lidgi et al. |
| 2023/0376586 A1 | 11/2023 | Shemesh et al. |
| 2024/0007492 A1 | 1/2024 | Shen et al. |
| 2024/0037229 A1 | 2/2024 | Pabón et al. |
| 2024/0045838 A1 | 2/2024 | Reiss et al. |
| 2024/0073115 A1 | 2/2024 | Chakraborty et al. |
| 2024/0080329 A1 | 3/2024 | Reed et al. |
| 2024/0080332 A1 | 3/2024 | Ganesh et al. |
| 2024/0146818 A1 | 5/2024 | Cody et al. |

(56) References Cited

U.S. PATENT DOCUMENTS

| | | | |
|---|---|---|---|
| 2024/0202359 A1 | 6/2024 | Shukla et al. |
| 2024/0241752 A1 | 7/2024 | Crabtree et al. |
| 2024/0259396 A1 | 8/2024 | Kerkar et al. |
| 2024/0370880 A1 | 11/2024 | Jeske et al. |
| 2025/0055870 A1 | 2/2025 | Viswambharan et al. |
| 2025/0086280 A1 | 3/2025 | Murphy et al. |

FOREIGN PATENT DOCUMENTS

| | | |
|---|---|---|
| CN | 112989379 A | 6/2021 |
| EP | 4160983 A1 | 4/2023 |
| EP | 4254869 A2 | 10/2023 |
| JP | 2017120492 A | 7/2017 |
| RU | 2421792 C2 | 6/2011 |
| SG | 10202009702X | 4/2021 |
| SG | 11202103226 U | 4/2021 |
| WO | 2004034184 A2 | 4/2004 |

OTHER PUBLICATIONS

Islam, Md Shihabul et al. Secure Real-Time Heterogeneous IoT Data Management System. 2019 First IEEE International Conference on Trust, Privacy and Security in Intelligent Systems and Applications (TPS-ISA). https://ieeexplore.ieee.org/stamp/ stamp.jsp?tp=&arnumber=9014355 (Year: 2019).

Safaryan, Olga A et al. Cryptographic Algorithm Implementation for Data Encryption in DBMS MS SQL Server. 2020 IEEE East-West Design & Test Symposium (EWDTS). https://ieeexplore.IEEE.org/stamp/stamp.jsp?tp=&arnumber=9224775 (Year: 2020).

Wassermann, Sarah et al. ViCrypt to the Rescue: Real-Time, Machine-Learning-Driven Video-QoE Monitoring for Encrypted Streaming Traffic. IEEE Transactions on Network and Service Management, vol. 17, Issue: 4. https://ieeexplore.ieee.org/stamp/ stamp.jsp?tp=&arnumber=9250645 (Year: 2020).

International Search Report for PCT/IB2023/050848, dated May 9, 2023. International Bureau of WIPO.

Written Opinion of the Searching Authority for PCT/IB2023/050848, dated May 9, 2023. International Bureau of WIPO.

Jordan, M. et al. Enabling pervasive encryption through IBM Z stack innovations. IBM Journal of Research and Development, vol. 62 Issue: 2/3, https://ieeexplore.ieee.org/stamp/stamp.jsp?tp&arnumber=8270590 (Year: 2018).

Leibenger, Dominik et al. EncFS goes multi-user: Adding access control to an encrypted file system. 2016 IEEE Conference on Communications and Network Security (CNS). https://ieeexplore.ieee.org/stamp/stamp.jsp?tp=&arnumber=7860544 (Year: 2016).

Siqi Ma; Certified Copy? Understanding Security Risks of Wi-Fi Hotspot based Android Data Clone Services; ACM; Year: 2021; pp. 320-331.

Sahil Suneja; Safe Inspection of Live Virtual Machines; IEEE; Year:2017; pp. 97-111.

Ali Gholami; Security and Privacy of Sensitive Data in Cloud Computing: A Survey of Recent Developments; ARIX:2016; pp. 131-150.

Christos Kyrkou; Towards artificial-intelligence-based cybersecurity for robustifying automated driving systems against camera sensor attacks; IEEE 2020; pp. 476-481.

Guo, yu et al. Enabling Encrypted Rich Queries in Distributed Key-Value Stores. IEEE Transactions on Parallel and Distributed Systems, vol. 30, Issue: 6. https://ieeexplore.ieee.org/stamp/stamp.jsp?tp=&arnumber=8567979 (Year: 2019).

Henry Hanping Feng; Anomaly Detection Using Call Stack Information; IEEE: Year:2003; pp. 1-14.

International Search Report for PCT Application No. PCT/IB2022/060940 dated Feb. 1, 2023. The International Bureau of WIPO.

International Search Report of PCT/IB2023/058074, dated Nov. 20, 2023. Searching Authority United States Patent and Trademark Office, Alexandria, Virginia.

International Search Report, PCT/IB23/55312. ISA/US, Commissioner for Patents, Alexandria, Virginia. Dated Aug. 30, 2023.

Kumar, Anuj et al. A New Approach for Security in Cloud Data Storage for IOT Applications Using Hybrid Cryptography Technique. 2020 International Conference on Power Electronics & IoT Applications in Renewable Energy and its Control. https://ieeexplore.ieee.org/stamp/stamp.jsp?tp=&arnumber=9087010 (Year: 2020).

Microsoft Build. "Introduction to Azure managed disks". Aug. 21, 2023, https://docs.microsoft.com/en-us/azure/virtual-machines/managed-disks-overview.

Microsoft Docs. "Create a VM from a managed image". Article. Jan. 5, 2022. https://docs.microsoft.com/en-US/azure/virtual-machines/windows/create-vm-generalized-managed.

Mishra, Bharati; Jena, Debasish et al. Securing Files in the Cloud. 2016 IEEE International Conference on Cloud Computing in Emerging Markets (CCEM). https://ieeexplore.ieee.org/stamp/stamp.jsp?tp=&arnumber=7819669 (Year: 2016).

Shuvo, Arfatul Mowla et al. Storage Efficient Data Security Model for Distributed Cloud Storage. 2020 IEEE 8th R10 Humanitarian Technology Conference (R10-HTC). https://ieeexplore.ieee.org/stamp/stamp.jsp?tp=&arnumber=9356962 (Year: 2020).

Written Opinion of the International Searching Authority for PCT Application No. PCT/IB2022/060940 dated Feb. 1, 2023. The International Bureau of WIPO.

Written Opinion of the International Searching Authority, PCT/IB23/55312. ISA/US Commissioner for Patents, Alexandria, Virginia. Dated Aug. 30, 2023.

Written Opinion of the Searching Authority of PCT/IB2023/058074, dated Nov. 20, 2023. Searching Authority United States Patent and Trademark Office, Alexandria, Virginia.

Zhang et al. BMC Bioinformatics 2014. "On finding bicliques in bipartite graphs: a novel algorithm and its application to the integration of diverse biological data types". http://www.biomedcentral.com/1471-2105/15/110.

No stated author; Downdetector; 2020; retrieved from the Internet https://web.archive.org/web/20201226001244/https://downdetector.com/; pp. 1-8, as printed. (Year: 2020).

No stated author; How to Run a Ping Test (Windows) 2020; retrieved from the Internet https://web.archive.org/web/20200811194856/https://support.shaw.ca/t5/internet-articles/how-to-run-a-ping-test-windows/ta-p/6677; pp. 1-6 as printed. (Year: 2020).

No stated author; IsltoownRightNow; 2020; retrieved from the Internet https://web.archive.org/web/20201202121557/https://www.isitdownrightnow.com/; pp. 1-2 as printed. (Year: 2020).

AWS, AWS managed policies for job functions, Oct. 26, 2021, https://web.archive.org/web/20211026212847/https:// docs.aws.amazon.com/IAM/latesUUserGuide/access_policiesjob-functions.html (Year: 2021).

Christie Koehler, Detecting and Managing Drift with Terraform, Jun. 7, 2018, https://www.hashicorp.com/en/blog/detecting-and-managing-drift-with-terraform (Year: 2018).

Extended European Search Report for EP 23746586.9 dated Jul. 23, 2025. European Patent Office, Munich, Germany.

GitHub, Complete EC2 Instance, Aug. 27, 2021, https://github.com/terraform-aws-modules/terraform-aws-ec2-instance/tree/528613d4580f2c1266e87d8d24fc25bf5290fe2c/examples/complete (Year: 2021).

GitHub, Complete EC2 Instance, Aug. 27, 2021, https://github.com/terraform-aws-modules/terraform-aws-ec2-instance/tree/528613d4580f2c1266e87d8d24fc25bf5290fe2c/examples/complete/main.tf (Year: 2021).

Google, Shift security left with on-demand vulnerability scanning, Aug. 25, 2021 https://cloud.google.com/blog/products/ identity-security/scan-for-vulnerabilities-early-to-shift-security-left-in-cicd (Year: 2021).

Proxify, Mastering good programming practices: A comprehensive guide, Apr. 27, 2021, https://proxify.io/articles/good-programming-practices (Year: 2021).

Reddit, 1AM Roles for each Lambda?, Aug. 25, 2019 (Year: 2019).

Bringhenti Daniele et al: "A novel approach for security function graph configuration and deployment", 2021 IEEE 7th International Conference On Network Softwarization (Netsoft), IEEE, Jun. 28,

(56) References Cited

OTHER PUBLICATIONS 2021 (Jun. 28, 2021), pp. 457-463, XP033948302, DOI: 10.1109/NETSOFT51509.2021.9492654 [retrieved on Jul. 20, 2021] * abstract * * Sections I-III *.
Espinha Gasiba Tiago Tiago Gasiba@Siemens Com et al: "Raising Security Awareness of Cloud Deployments using Infrastructure as\ Code through CyberSecurity Challenges", Proceedings of the 1st Conference On Mile-High Video, ACMPUB27, New York, Ny, USA, Aug. 17, 2021 (Aug. 17, 2021), pp. 1-8, XP058860050, DOI: 10.1145/3465481.3470030 ISBN: 978-1-4503-9606-6 * abstract * * Sections 1-3 *.
European Search Report and Opinion for EP application 23811275.9, dated Sep. 25, 2025. European Patent Office, Munich, Germany.
Extended European Search Report and Opinion for EP 22898020.7, dated Sep. 9, 2025. European Patent Office, Munich, Germany.

* cited by examiner

TECHNIQUES FOR UTILIZING A SENSOR IN DETECTING PRIVILEGE ESCALATION

CROSS-REFERENCE TO RELATED APPLICATIONS

This application is continuation in part of U.S. patent application Ser. No. 18/162,412 filed Jan. 31, 2023, which itself claims the benefit of U.S. Provisional Patent Application No. 63/267,368 filed on Jan. 31, 2022. This application is also a continuation in part of U.S. patent application Ser. No. 18/045,046 filed Oct. 7, 2022. All contents of these applications are hereby incorporated by reference.

TECHNICAL FIELD

The present disclosure relates generally to detection of cybersecurity threats, and specifically to complementary solutions for cybersecurity threat detection utilizing static analysis and runtime data.

BACKGROUND

Cybersecurity threats come in many shapes and forms, such as malware, worms, cryptominers, man-in-the-middle attacks, code injection, misconfigurations, and so on. Different threats pose different risks, and can often be detected in different ways. As such, there are many solutions which detect different types of cybersecurity threats, each with advantages and disadvantages. Cloud computing platforms, such as provided by Amazon® Web Services (AWS), Google® Cloud Platform (GCP), Microsoft® Azure, and the like, are high value targets for attackers, and therefore their vulnerabilities are more likely to become cybersecurity threats. It is therefore extremely useful to detect such cybersecurity threats.

For example, agent based solutions are able to detect both runtime and stored data, allowing to form a complete picture of the cybersecurity status of a machine having the agent installed thereon. However, agent based solutions require heavy use of compute resources, such as processor and memory resources. This is due to the agent being deployed on the machine which is scanned. For endpoints in a network, this type of solution is impractical, as the use of those resources is reserved for performing the task of the endpoint machine. Furthermore, some agent solutions also require communication with a backend which provides definitions, rules, and the like, in order to enable the agent to scan for cybersecurity threats using up to date information. Additionally, some agent based solutions require root privileges, or are deployed as a privileged software container. This in itself is a security risk, as conveying such permissions is inherently risky. Therefore, as an endpoint detection and response (EDR) solution for a cloud computing production environment, agent based solutions fail at their objective, and indeed such solutions are rarely used on network endpoints due to the above mentioned reasons.

Agentless solutions, on the other hand, do not require an agent installed on a machine. These solutions include static analysis, for example of a disk of a machine, to determine what cybersecurity threats are present. However, such solutions likewise fail at providing a complete picture, since static analysis solutions do not have access to runtime data. Such agentless solutions also fail to provide real time threat detection, thereby potentially leaving cybersecurity threats with a response for prolonged periods of time.

Utilizing both types of solution is not practical, as there is overlap in the data of agent and agentless solutions, and the computational costs of deploying both solutions on a single network are great. This leads, in practice, to a choice between either type of solution, with the resignation that some threats will inevitably go undetected.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include configuring the resource to deploy thereon a sensor, the sensor configured to listen on a data link layer of the resource for an event. Method may also include receiving from the sensor a permission-based event based on a first actor, the permission-based event indicating a first permission set of the first actor. Method may furthermore include querying a database to detect a second permission set of the first actor. Method may in addition include detecting that the first permission set includes a permission which is not in the second permission set. Method may moreover include determining that the resource is involved in a privilege escalation event in response to detecting that the first permission set includes a permission which is not in the second permission set. Method may also include initiating a mitigation action in response to the determined privilege escalation event. Other embodiments of this aspect include corresponding computer systems, apparatus, and computer programs recorded on one or more computer storage devices, each configured to perform the actions of the methods.

Implementations may include one or more of the following features. Method may include: detecting in the database a parent actor of the first actor, where the parent actor is associated with a third permission set; and determining that the resource is involved in a privilege escalation event in response to detecting that the first permission set includes a permission which is not in the third permission set. Method may include: configuring the sensor to transmit an event of a second type, in response to determining the privilege escalation event. Method may include: receiving an event of the second type; and determining that the resource is a compromised resource in response to receiving the event of the second type. Method may include: configuring the sensor to perform any one of: detect an additional event, detect an additional event type, transmit an additional event, transmit an additional event type, and any combination thereof. Method may include: detecting an event indicating generation of the first actor in the resource. Method may include: generating an instruction to inspect the resource for a cybersecurity object. Method where the mitigation action includes any one of: generating an alert, assigning a severity score to an alert, modifying a severity score of an alert, and any combination thereof. Method where the permission-based event includes any one of: an event which indicates generating a new actor, an event indicating updating permissions of an existing actor, an event indicating generating a new process, an event indicating updating permissions of an existing process, and any combination thereof. Implementations of the described techniques may include hardware, a method or process, or a computer tangible medium.

In one general aspect, non-transitory computer-readable medium may include one or more instructions that, when executed by one or more processors of a device, cause the device to: configure the resource to deploy thereon a sensor, the sensor configured to listen on a data link layer of the resource for an event. Medium may furthermore receive from the sensor a permission-based event based on a first actor, the permission-based event indicating a first permission set of the first actor. Medium may in addition query a database to detect a second permission set of the first actor. Medium may moreover detect that the first permission set includes a permission which is not in the second permission set. Medium may also determine that the resource is involved in a privilege escalation event in response to detecting that the first permission set includes a permission which is not in the second permission set. Medium may furthermore initiate a mitigation action in response to the determined privilege escalation event. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: configure the resource to deploy thereon a sensor, the sensor configured to listen on a data link layer of the resource for an event. System may in addition receive from the sensor a permission-based event based on a first actor, the permission-based event indicating a first permission set of the first actor. System may moreover query a database to detect a second permission set of the first actor. System may also detect that the first permission set includes a permission which is not in the second permission set. System may furthermore determine that the resource is involved in a privilege escalation event in response to detecting that the first permission set includes a permission which is not in the second permission set. System may in addition initiate a mitigation action in response to the determined privilege escalation event. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: detect in the database a parent actor of the first actor, where the parent actor is associated with a third permission set; and determine that the resource is involved in a privilege escalation event in response to detecting that the first permission set includes a permission which is not in the third permission set. System where the memory contains further instructions which when executed by the processing circuitry further configure the system to: configure the sensor to transmit an event of a second type, in response to determining the privilege escalation event. System where the memory contains further instructions which when executed by the processing circuitry further configure the system to: receive an event of the second type; and determine that the resource is a compromised resource in response to receiving the event of the second type. System where the memory contains further instructions which when executed by the processing circuitry further configure the system to: configure the sensor to perform any one of: detect an additional event, detect an additional event type, transmit an additional event, transmit an additional event type, and any combination thereof. System where the memory contains further instructions which when executed by the processing circuitry further configure the system to: detect an event indicating generation of the first actor in the resource. System where the memory contains further instructions which when executed by the processing circuitry further configure the system to: generate an instruction to inspect the resource for a cybersecurity object. System where the mitigation action includes any one of: generating an alert, assigning a severity score to an alert, modifying a severity score of an alert, and any combination thereof. System where the permission-based event includes any one of: an event which indicates generating a new actor, an event indicating updating permissions of an existing actor, an event indicating generating a new process, an event indicating updating permissions of an existing process, and any combination thereof. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
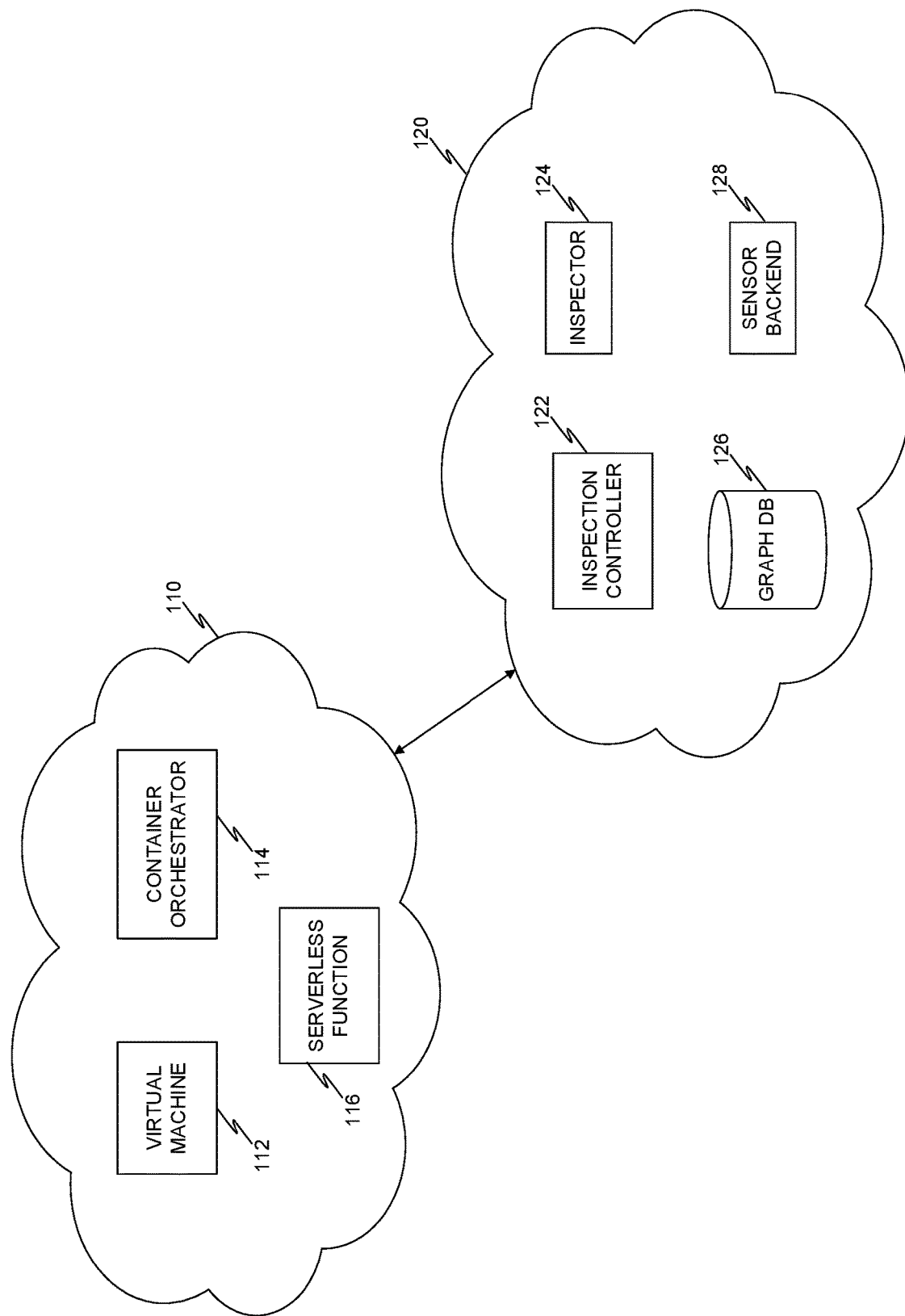
FIG. 1 is a schematic diagram of a cloud computing environment monitored for a cybersecurity threat by an inspection environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing a sensor deployed on a workload in a cloud computing environment, to complement detection of cybersecurity threats, and specifically of privilege escalation events, using static analysis techniques. A sensor is a software package executable on a machine, such as an endpoint machine. An endpoint machine (or simply "endpoint") may be, for example, a proxy, a gateway, a reverse proxy, a webserver, and the like. A sensor is able to deploy on an endpoint utilizing less resources than an agent, as the sensor is configured to retrieve and analyze less data than an agent software is. This is due to the sensor capabilities being complemented by a static analysis solution, such as a cybersecurity threat inspector.

In an embodiment, the sensor is configured to listen to a data link layer. For example, in an embodiment, a sensor is configured to listen for packets utilizing the extended Berkeley Packet Filter (eBPF) interface. In certain embodiments, the sensor is configured to request rules, definitions, and the like, from a sensor backend server. The sensor is configured, for example, to apply a rule from the requested rules, definitions, and the like to an event detected by listening on the eBPF interface of a machine on which the sensor is deployed. In certain embodiments, the sensor is configured to send an event to the sensor backend server, for example in response to determining that the event matches a predefined definition.

In an embodiment, the data link layer is also known as layer 2 of the OSI model of computer networking. In some embodiments, the data link layer is configured to transfer frames, which are containers for network packets. For example, Ethernet™, Frame Relay, PPP, USB, PCI Express, and the like, are protocols for data link layer communication. In TCP/IP, the data link layer is the lowest layer, known as the link layer.

In certain embodiments the sensor is configured to send an event, for example based on a predetermined definition, to a sensor backend server, which is configured to store the event on a security graph. The security graph includes a representation of the cloud computing environment in which the endpoint is deployed. For example, the sensor may detect that the endpoint sent a network packet to an IP address which is associated with a known cybersecurity risk, such as a coin mining pool. The sensor is configured to generate a notification to a sensor backend server. In an embodiment, the sensor backend server is configured to generate an instruction for an inspection controller. The inspection controller, in turn, is configured to provision an inspector to inspect the endpoint for the presence of a cryptominer malware.

By performing runtime and static analysis in this manner, the overlap in detection between the sensor and inspector are reduced. Additionally, the sensor is able to initiate inspection by the inspector, which allows efficient prioritizing of inspection resources, thereby reducing time to detection of cybersecurity threats, which also reduces time to respond to cybersecurity threats.

FIG. 1 is an example schematic diagram of a cloud computing environment monitored for a cybersecurity threat by an inspection environment, implemented in accordance with an embodiment. In an embodiment, a cloud computing environment 110 is implemented as a virtual private cloud (VPC), Virtual Network (VNet), and the like, over a cloud computing platform. A cloud computing platform may be provided, for example, by Amazon® Web Services (AWS), Google® Cloud Platform (GCP), Microsoft® Azure, and the like. A cloud computing environment 110 includes cloud entities deployed therein. A cloud entity may be, for example, a principal, a resource, a combination thereof, and the like. In an embodiment, a resource is a cloud entity which provides access to a compute resource, such as a processor, a memory, a storage, and the like. In some embodiments a resource is a virtual machine, a software container, a serverless function, and the like. A resource may be, or may include, a software application deployed thereon, such as a webserver, a gateway, a load balancer, a web application firewall (WAF), an appliance, and the like.

In certain embodiments, a principal is a cloud entity which is authorized to initiate actions in the cloud computing environment. A cloud entity may be, for example, a user account, a service account, a role, and the like. In some embodiments, a cloud entity is a principal relative to another cloud entity, and a resource to other cloud entities. For example, a load balancer is a resource to a user account requesting a webpage from a webserver behind the load balancer, and the load balancer is a principal to the webserver.

The cloud computing environment 110 includes a plurality of resources, such as virtual machine 112, software container orchestrator 114, and serverless function 116. A virtual machine 112 may be deployed, for example, utilizing Oracle® VirtualBox®. A software container orchestrator 114 may be deployed, for example, utilizing a Docker® engine, a Kubernetes® engine, and the like. In an embodiment, a software container orchestrator 114 is configured to deploy a software cluster, each cluster including a plurality of nodes. In an embodiment, a node includes a plurality of pods. A serverless function 116, may be, for example, utilized with Amazon® Lambda. In an embodiment, the serverless function 116 is a serverless function container image.

Each such resource is susceptible to various cybersecurity threats. Such threats can become apparent for example due to a software version of an application in a software container 114, an operating system (OS) version of a virtual machine 112, a misconfiguration in code of a serverless function 116, and the like. The cloud computing environment 110 is monitored for cybersecurity threats by an inspection environment 120. In an embodiment, the inspection environment is implemented as a cloud computing environment, such as a VPC, VNet, and the like.

In an embodiment, each of the virtual machine 112, the software container 114, and the serverless function 116 include a sensor configured to a particular resource, resource type, combination thereof, and the like. An example deployment of a sensor is discussed in more detail in FIG. 2 below.

In an embodiment, the sensor (not shown in FIG. 1) is configured to listen for events, packets, and the like, on a data link layer. For example, the sensor is configured to utilize an eBPF interface, which allows non-intrusive monitoring of the data link layer communication. In certain embodiments, the sensor is further configured to send data to and receive data from a sensor backend server 128. The sensor backend server 128 is a workload, such as a virtual machine, software container, serverless function, combination thereof, and the like, which is deployed in the inspection environment 120.

In an embodiment, the sensor backend server 128 is configured to receive sensor generated data. For example, the sensor backend server 128 is configured, in an embodiment, to receive events from a sensor. In some embodiments, the sensor is configured to request from the sensor backend server 128 rules, definitions, and the like, which the sensor is configured to apply to events, for example as detected on an eBPF interface. For example, a predetermined event, such as indicating access to an IP address, IP address range, and the like, may be checked against a definition. A definition is a logical expression which, when applied to an event, yields a "true" or "false" result. In an embodiment, a rule is a logical expression which includes an action. For example, a rule may be that if a certain definition is true when applied to an event, data pertaining to the event should be sent to the sensor backend server 128.

In some embodiments, the sensor backend server 128 is configured to initiate inspection of a resource deployed in the cloud computing environment 110. For example, the sensor backend server 128 may be configured to initiate such inspection in response to receiving an event, data, a combination thereof, and the like, from a sensor deployed on a resource. In an embodiment, initiating inspection of a resource is performed by generating an instruction for an inspection controller 122. The instruction, when executed, configures an inspector 124 to inspect the resource.

For example, a sensor is configured to send event data to the sensor backend server 128 in response to detecting that a definition, applied by the sensor to a detected event, results in a "true" value when applied. As an example, the definition may be "is the IP address in the range of 127.0.0.1 through 127.0.0.99," which in this example corresponds to an IP address range used by a malware, such as a cryptominer. When the definition is applied, for example to a detected network packet, and the result is "true," the sensor is configured to send data pertaining to the event to the sensor backend server 128. Data pertaining to the event may be, for example, an IP address, an event type, combinations thereof, and the like.

In an embodiment, the sensor backend server 128 is configured to receive the data. In some embodiments, the sensor backend server 128 is further configured to apply a rule to the received data to determine if an inspection of the workload on which the sensor is deployed should be inspected for a cybersecurity threat. For example, the sensor backend server 128 is configured to generate an instruction to inspect a virtual machine 112, in response to receiving an indication from a sensor deployed as service on the virtual machine that a communication has been detected between the virtual machine 112 and a server having an IP address which is a forbidden IP address, such as an IP address associated with a malware.

For example, the sensor backend server 128 may generate an instruction for the inspection controller 122, which when executed by the inspection controller generates a an inspectable disk, for example utilizing a snapshot, a copy, a clone, and the like of a disk (not shown) associated with the virtual machine 112, and provides access to an inspector 124 to the inspectable disk. In an embodiment the inspector 124 is configured to detect a cybersecurity threat. For example, the inspector 124 is configured to receive, in an embodiment, a hash of an application stored on the inspectable disk, and determine if the hash matches a hash of known malware applications. In certain embodiments, the inspector 124 is provided with a persistent volume claim (PVC) to the inspectable disk.

In some embodiments, the sensor is configured to generate a hash of an application on the resource, such as the virtual machine 112, on which it is deployed, and send the hash to the sensor backend server 128. The received hash may then be compared, for example by providing it to the inspector 124, with known hash values which correspond to malware applications.

While the examples above discuss malware and cryptominers, it is readily apparent that the sensor and inspector 124 may be utilized to detect other types of cybersecurity threats, such as an exposure, a vulnerability, a weak password, an exposed password, a misconfiguration, and the like.

In certain embodiments, the inspection environment 120 further includes a graph database 126, on which a security is stored. In an embodiment, the security graph is configured to store a representation of a cloud computing environment, such as cloud computing environment 110. For example, the representation may be based on a predefined unified data schema, so that each different cloud platform may be represented using a unified data schema, allowing for a unified representation. For example, a principal may be represented by a predefined data structure, each principal represented by a node in the security graph. Likewise, a resource may be represented by another predefined data structure, each resource represented by a node in the security graph.

In certain embodiments, data received from a sensor deployed on a resource in the cloud computing environment may be stored in the graph database as part of the security graph. In the example above, in response to receiving data from the sensor which indicates a potential malware infection of the virtual machine 112, the sensor backend server 128 is configured, in an embodiment, to: generate a node representing the malware in the security graph, generate a node in the security graph representing the virtual machine 112, and connect the node representing the malware with the node representing the virtual machine 112.

Figure 2:
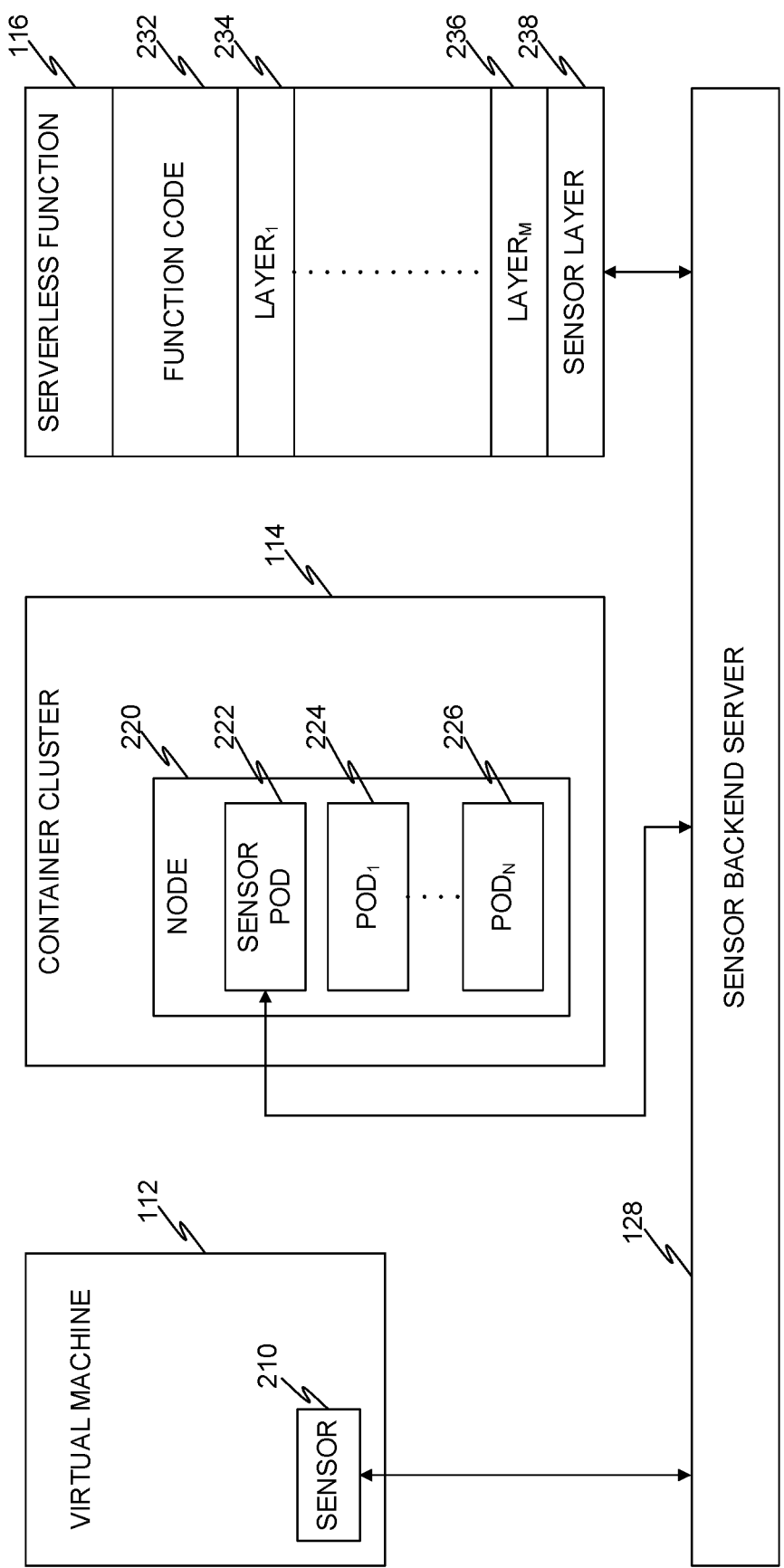
FIG. 2 is a schematic illustration of a sensor backend server communicating with a plurality of sensors deployed on various workloads, implemented in accordance with an embodiment.

FIG. 2 is an example schematic illustration of a sensor backend server communicating with a plurality of sensors deployed on various workloads, implemented in accordance with an embodiment. In some embodiments, a sensor backend server 128 is configured to communicate with a machine (not shown) having a sensor installed thereon and communicatively coupled with the sensor backend server 128. In an embodiment, the machine is bare metal machine, a computer device, a networked computer device, a laptop, a tablet, and the like computing devices.

In an embodiment, a sensor backend server 128 is implemented as a virtual machine, a software container, a serverless function, a combination thereof, and the like. In certain embodiments, a plurality of sensor backend servers 128 may be implemented. In some embodiments where a plurality of sensor backend servers 128 are utilized, a first group of sensor backend servers of the plurality of sensor backend servers is configured to communicate with a sensor deployed on a first type of resource (e.g., virtual machine), a second group of sensor backend servers is configured to communicate with resources of a second type, etc. In an embodiment, a first group of sensor backend servers is configured to communicate with sensors deployed on resources in a first cloud computing environment deployed on a first cloud platform (e.g., AWS) and a second group of sensor backend servers is configured to communicate with sensors deployed on resources in a second cloud computing environment deployed on a second cloud platform (e.g., GCP).

A virtual machine 112 includes a sensor 210. In an embodiment, the sensor 210 is deployed as a service executed on the virtual machine 112. In some embodiments, a virtual machine 112 is configured to request binary code, a software package, and the like, for example from a sensor backend sever 128, which when executed by the virtual machine 112 cause a sensor 210 to run as a service on the virtual machine 112. The sensor 210 is configured to listen to a data link layer communication, for example through an eBPF interface.

A container cluster 114 runs a daemonset, and includes a plurality of nodes, such as node 220. The daemonset ensures that each node 220 runs a daemonset pod 222, which is configured as a sensor. For example, a Kubernetes® cluster may execute a daemonset configured to deploy a daemonset pod on each deployed node, wherein the daemonset pod is configured to listen to a data link layer communication, for example through an eBPF interface, to communication of a plurality of pods, such as pod-1 224 through pod-N 226, where 'NI' is an integer having a value of '1' or greater. The daemonset pod 222 is configured, in an embodiment, to communicate with the sensor backend server 128.

A serverless function 116 includes, in an embodiment, a function code 232, and a plurality of code layers 1 through M (labeled respectively as 234 through 236), where 'M' is an integer having a value of '1' or greater. For example, in AWS Lambda a layer contains, in an embodiment, code, content, a combination thereof, and the like. In some embodiments, a layer, such as layer 234 includes runtime data, configuration data, software libraries, and the like.

In certain embodiments, the serverless function 116 includes a sensor layer 238. The sensor layer 238 is configured, in an embodiment, to listen to a data link layer communication of the serverless function 116, for example through an eBPF interface.

The sensor service 210, daemonset pod 222, and sensor layer 238 are each an implementation of a sensor, according to an embodiment. In an embodiment, a sensor is configured to communicate with a sensor backend server 128 through a transport layer protocol, such as TCP. For example, the sensor backend server 128 is configured, in an embodiment, to listen to a predetermined port using a TCP protocol, and a sensor, such as sensor 210, daemonset pod 222, and sensor layer 238 are each configured to communicate with the backend sensor server 128, for example by initiating communication using TCP over the predetermined port.

Figure 3:
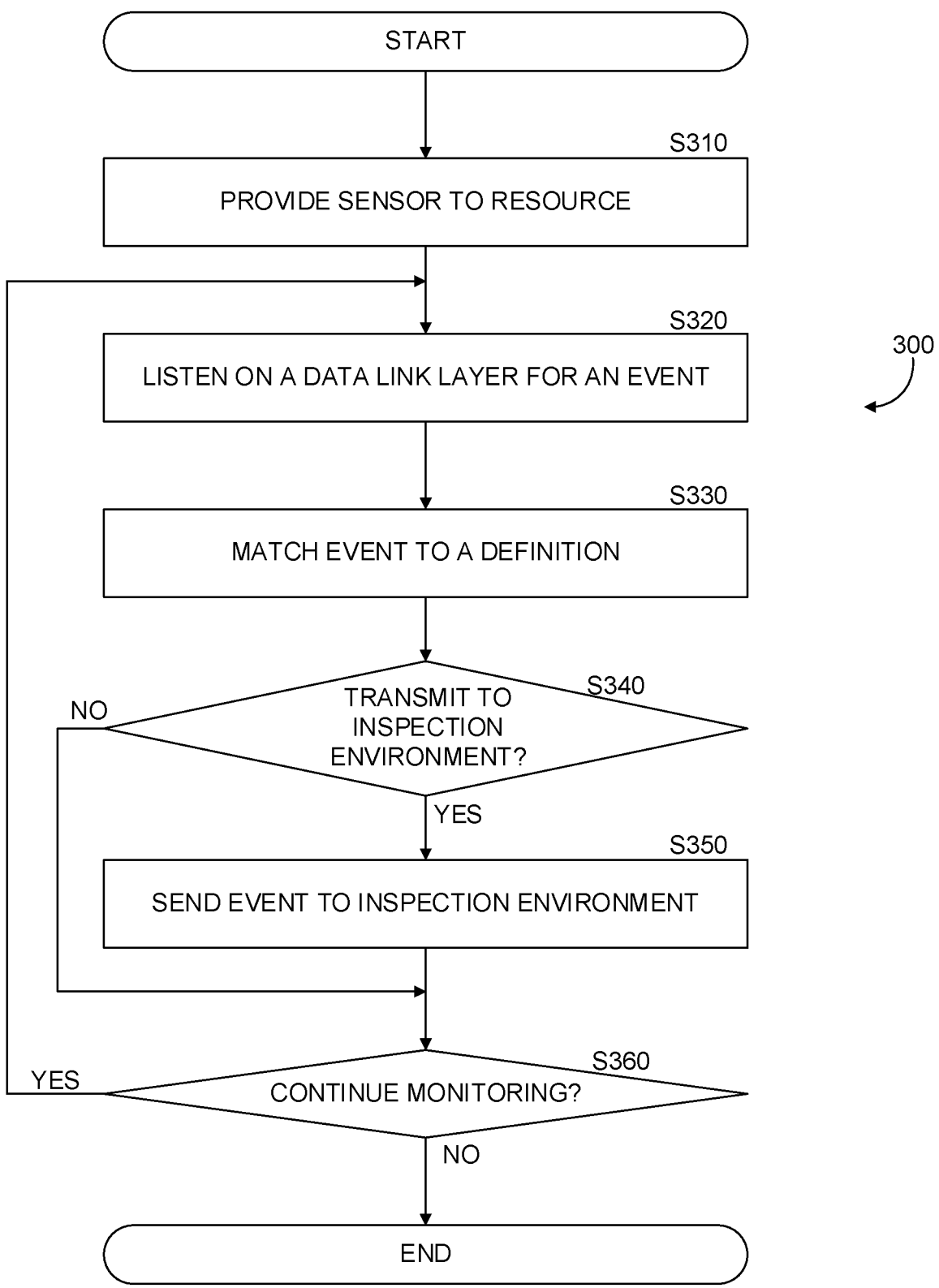
FIG. 3 is a flowchart of a method for performing cybersecurity threat detection on a resource in a cloud computing environment, implemented in accordance with an embodiment.

FIG. 3 is an example flowchart 300 of a method for performing cybersecurity threat detection on a resource in a cloud computing environment, implemented in accordance with an embodiment.

At S310, a resource is provided with a sensor software. In an embodiment, the resource is any one of a virtual machine, a software container, a serverless function, and the like. In certain embodiments, the sensor software is provided based on the resource type. For example, a virtual machine is provided with a software package, such as an executable code, for example a binary code. A software container engine is provided with a daemonset, so that, in an embodiment where a node is deployed in a cluster of the software container engine, the node includes a daemonset pod which is configured to provide the functionality of a sensor, for example such as detailed above. In an embodiment, a serverless function is provided with a sensor layer by providing a code for example in a .ZIP file.

In an embodiment, providing a sensor includes configuring a resource, such as a virtual machine, software container, serverless function, and the like, to receive software which, when executed, configures the resource to deploy a sensor thereon.

At S320, an event is detected from a data link layer communication. In an embodiment, the data link layer is monitored through an eBPF interface for events. In certain embodiments, a software bill of materials (SBOM) is generated. An SBOM may be implemented as a text file, which is based off of events which were detected, for example through the eBPF interface. In an embodiment, an SBOM includes an identifier of a library which is accessed in runtime, an identifier of a binary which is accessed in runtime, an image of which an instance is deployed in runtime, a port which is accessed by a runtime program, a cryptographic hash function value (such as an SHA1, SHA2, and the like values), and the like. For example, an SBOM may include:

```
programs {
    exe_name: "/usr/sbin/rpc.mountd"
    last_seen: 1663138800
    exe_size: 133664
    exe_sha1: "200f06c12975399a4d7a32e171caabfb994f78b9"
    modules {
        path: "/usr/lib/libresolv-2.32.so"
        last_seen: 1663138800
    }
    modules {
        path: "/usr/lib/libpthread-2.32.so"
        last_seen: 1663138800
    }
    modules {
        path: "/usr/lib/ld-2.32.so"
        last_seen: 1663138800
    }
    modules {
        path: "/usr/lib/libc-2.32.so"
        last_seen: 1663138800
    }
    modules {
        path: "/usr/lib/libtirpc.so.3.0.0"
        last_seen: 1663138800
    }
    modules {
        path: "/usr/lib/libnss_files-2.32.so"
        last_seen: 1663138800
    }
    modules {
        path: "/usr/sbin/rpc.mountd"
        last_seen: 1663138800
    }
    listening_sockets {
        ip_addr: "0.0.0.0"
        port : 60311
    }
    listening_sockets {
        ip_addr: "0.0.0.0"
        port : 43639
    }
}
```

This portion of an SBOM indicates that a remote procedure call (RPC) is executed, which is configured to receive a client request to mount a file system.

At S330, the event is matched to a definition. In some embodiments, a definition includes a logical expression, which when applied to an event results in a "true" or "false" value. For example, a definition may state "software library xyz is accessed," with a result being either true or false, when applied to an event. In some embodiments, a rule is applied to an event. In an embodiment, a rule is a logical expression which further includes an action. For example, a rule states, in an embodiment, "IF software library xyz is accessed by UNKNOWN SOFTWARE, generate an alert." In this example, where an event is detected in which a software having an unknown identifier, for example which does not match a list of preapproved identifiers, attempts to access software library xyz, an alert is generated to indicate that such access is performed.

At S340, a check is performed to determine if data should be transmitted to an inspection environment. In some embodiments, the check is performed by applying a rule to an event, and determining transmission based on an output of applying the rule. If 'yes,' execution continues at S350, if 'no' execution continues at S360.

At S350, data respective of an event is transmitted to an inspection environment. In an embodiment, the data is based on an SBOM file. In some embodiments, the data includes event data, such as an identifier of a resource (e.g., virtual machine, software container, serverless function, etc.), an identifier of an application, a hash value, a uniform resource locator (URL) request, a software library identifier, a software binary file identifier, a timestamp, and the like.

At S360, a check is performed to determine if monitoring of the resource should continue. For example, a daemonset of a container may be configured to periodically deploy a daemonset pod to monitor pods in a node. As another example, a virtual machine may be configured to periodically deploy a sensor service which runs as a process on the virtual machine, terminate the process after a predetermined period of time, terminate the process after a predetermined number of detected events, and the like. In some embodiments, the check is performed based on a predetermined amount of elapsed time (e.g., every four hours, every day, twice a day, etc.). If 'yes,' execution continues at S320. If 'no,' in an embodiment execution terminates. In some embodiments, if 'no,' another check is performed at S360, for example after a predetermined period of time has lapsed.

Figure 4:
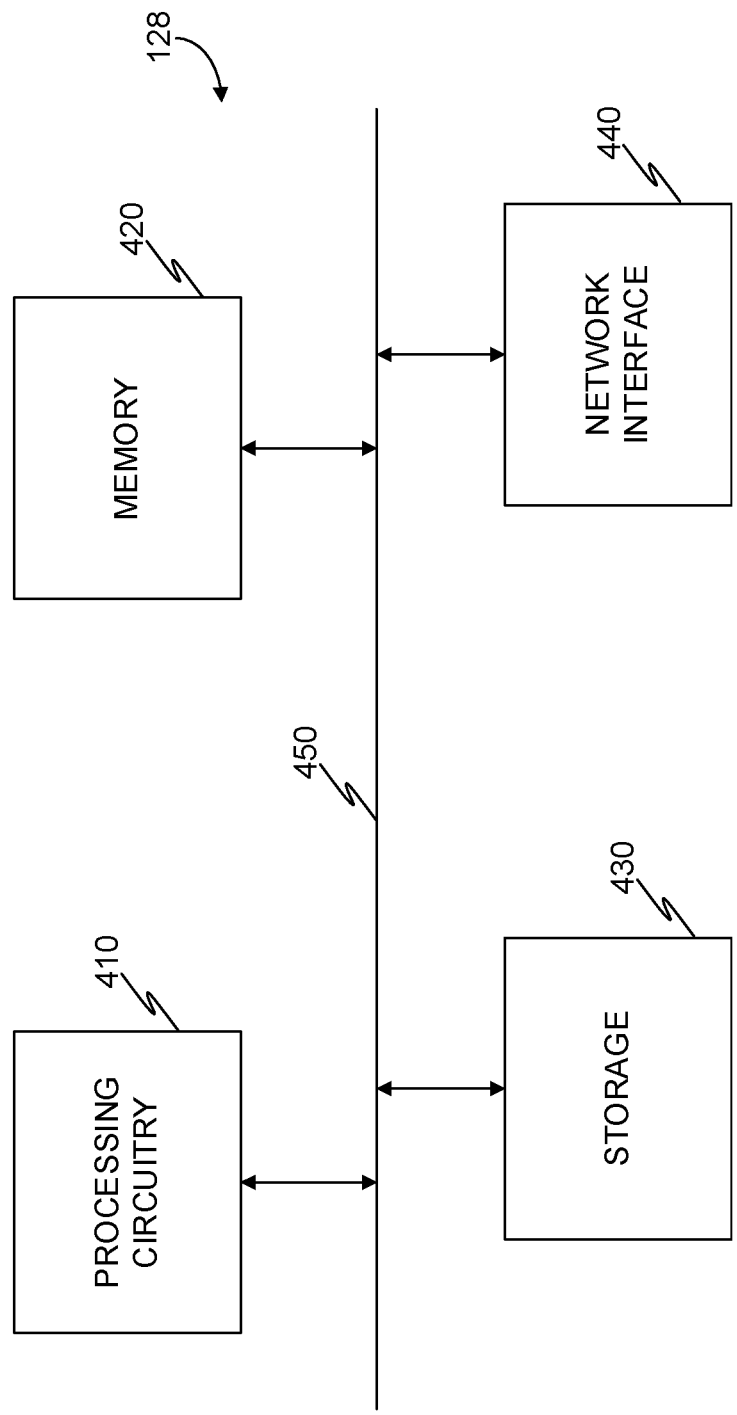
FIG. 4 is a schematic diagram of a sensor backend server according to an embodiment.

FIG. 4 is an example schematic diagram of a sensor backend server 128 according to an embodiment. The sensor backend server 128 includes a processing circuitry 410 coupled to a memory 420, a storage 430, and a network interface 440. In an embodiment, the components of the sensor backend server 128 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the sensor backend server 128 to communicate with, for example, a sensor 210, a daemonset pod 222, a sensor layer 238, and the like.

It should be understood that the embodiments described herein are not limited to the specific architecture illustrated in FIG. 4, and other architectures may be equally used without departing from the scope of the disclosed embodiments.

Furthermore, in certain embodiments the inspection controller 122, inspector 124, and the like, may be implemented with the architecture illustrated in FIG. 4. In other embodiments, other architectures may be equally used without departing from the scope of the disclosed embodiments.

Figure 5:
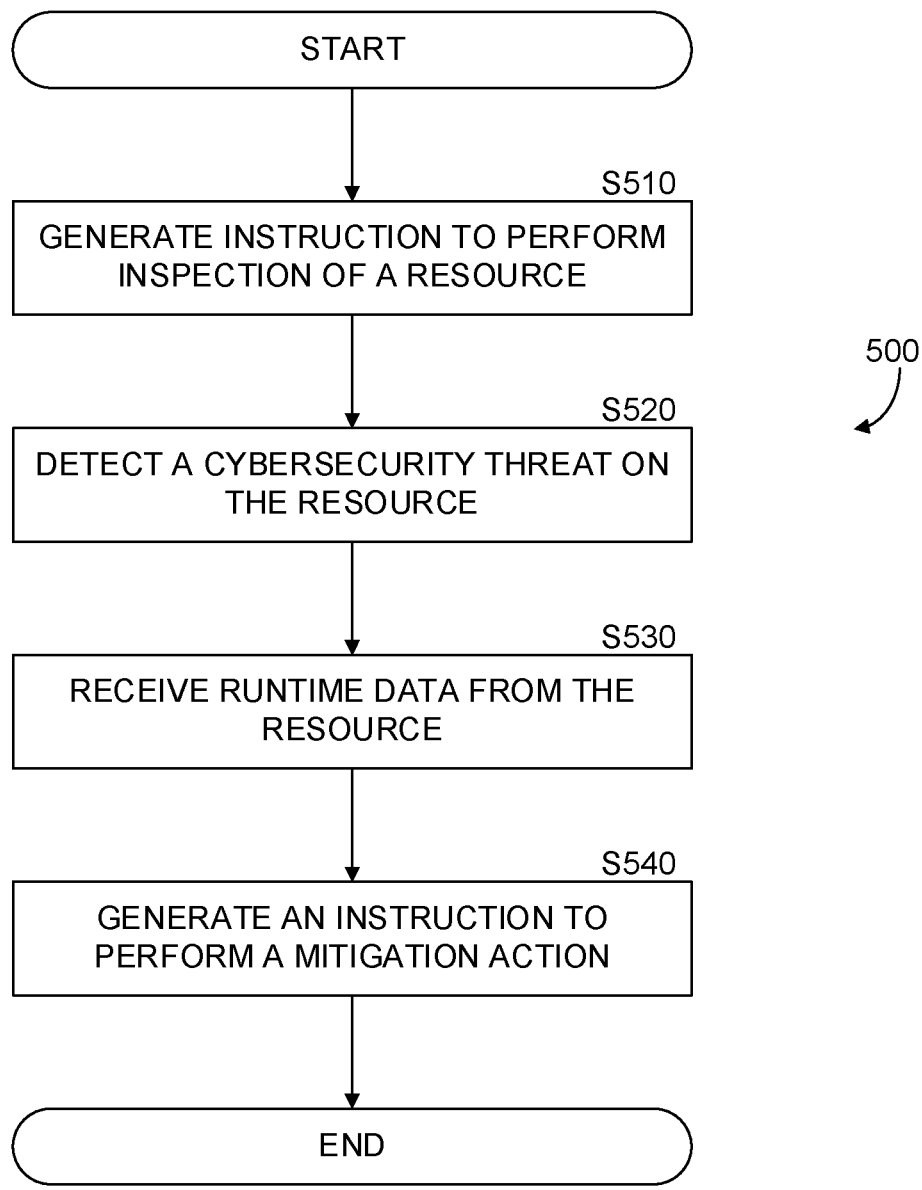
FIG. 5 is a flowchart of a method for mitigating a cybersecurity threat, implemented in accordance with an embodiment.

FIG. 5 is an example flowchart 500 of a method for mitigating a cybersecurity threat, implemented in accordance with an embodiment.

At S510, an instruction to perform inspection is generated. In an embodiment, inspection is performed on a resource, which may be, for example, a virtual machine, a software container, a serverless function, and the like. In an embodiment, the instruction, when executed, generates an inspectable disk based on a disk of a resource. For example, in an embodiment an inspectable disk is generated by performing a snapshot, a clone, a copy, a duplicate, and the like, of a disk attached to a virtual machine. The inspectable disk is accessible by an inspector. In an embodiment, the inspector utilizes static analysis techniques, for example to detect cybersecurity objects, such as a password, a certificate, an application binary, a software library, a hash, and the like.

The detected cybersecurity objects, cybersecurity threats, and the like, are represented, in an embodiment, in a security graph. For example, a node is generated in an embodiment to represent a malware object. The node representing the malware object is connected to a node representing the resource on which an inspector detected the malware object, to indicate that the malware object is present on the resource.

At S520, a cybersecurity threat is detected. In an embodiment, a cybersecurity threat is detected in response to detecting a cybersecurity object on a disk. In certain embodiments, a cybersecurity threat is an exposure, a vulnerability, a misconfiguration, a malware code object, a hash, a combination thereof, and the like. In some embodiments, a hash, which is detected or generated, is compared to another hash of a list of hashes which indicate know cybersecurity threats. For example, malware code objects are often detected by generating hashes of code objects and comparing them to hashes stored in a database of known hashes which are associated with malicious software. In certain embodiments, the cybersecurity threat is a potential cybersecurity threat. In an embodiment, runtime data is utilized to determine if the potential cybersecurity threat is an actual cybersecurity threat.

At S530, runtime data is received. In an embodiment, the runtime data is received from the inspected resource. In certain embodiments, runtime data is received based on cybersecurity objects detected by static analysis methods performed on the resource. For example, an inspector accessing an inspectable disk which is generated based on a disk of a virtual machine deployed in a cloud computing environment detects application libraries, which are cybersecurity objects. In an embodiment a definition is generated based on the detected cybersecurity objects. For example, a cybersecurity object may be a binary of application "xyz." A definition is generated based on the detected cybersecurity object, for example "Application xyz is deployed in runtime." In an embodiment, a rule is generated, for example based on the definition, further stating "IF application xyz is deployed in runtime, THEN perform mitigation action."

At S540, an instruction to perform a mitigation action is generated. In an embodiment, the instruction, when executed, initiates a mitigation action in the cloud computing environment in which the resource is deployed. In some embodiments, the mitigation action is generated based on the detected cybersecurity threat and the received runtime data. In certain embodiments, the mitigation action includes generating an alert, assigning a severity score to an alert (e.g., low, moderate, severe, critical), modifying a severity score of an alert, and the like.

While static analysis techniques can detect such cybersecurity objects and threats, runtime data is required to determine if the cybersecurity objects and threats are actually present in runtime. For example, a database having a misconfiguration, such as no password protection, is considered a cybersecurity threat. Typically, an alert is generated in response to detecting such a cybersecurity threat, and a mitigation action is initiated. However, in cloud computing production environments many such alerts are generated, and therefore it is desirable to prioritize alerts based, for example, on a severity of an event. In this example, if a process for managing the database is not present at runtime, then the severity of the cybersecurity threat is actually lower than if the database software was running, and therefore presented an actual cybersecurity threat. It is therefore beneficial to combine static analysis data with runtime data in an efficient manner in order to prioritize responses, such as mitigation actions, to detected cybersecurity threats. This allows to better utilize the compute resources of a cloud computing environment, and improving response time to cybersecurity threats based on actual severity.

Figure 6:
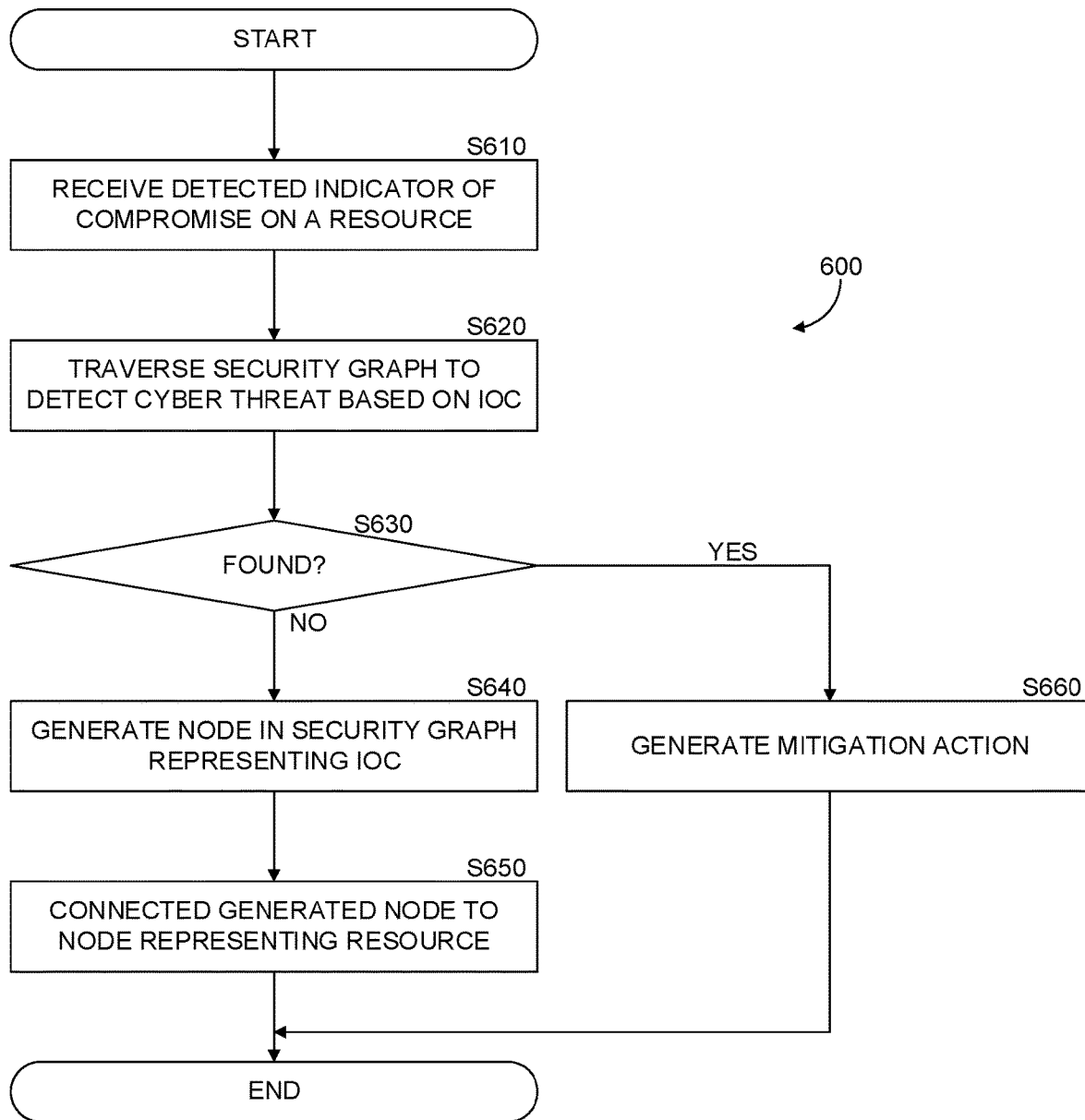
FIG. 6 is a flowchart of a method for utilizing a security graph in detecting a cybersecurity threat based on an indicator of compromise, implemented in accordance with an embodiment.

FIG. 6 is an example flowchart 600 of a method for utilizing a security graph in detecting a cybersecurity threat based on an indicator of compromise, implemented in accordance with an embodiment.

At S610, an indicator of compromise (IOC) is received. In an embodiment, the IOC is received from a sensor, the sensor configured to detect an IOC. In certain embodiments, an IOC is data, such as network traffic data, login data, access data, a data request, and the like. For example, IOC data indicates, in an embodiment, unusual network traffic, unusual login time, unusual logged-in user session time, a high volume of requests for data, network traffic to restricted domains, network traffic to suspicious geographical domains, mismatched port-application network traffic (i.e. sending command and control communication as a DNS request over port 80), and the like.

In certain embodiments, an IOC data is generated based on an aggregation of events detected on a resource, for example on a virtual machine. In an embodiment, a sensor is configured to store a plurality of events, and generate aggregated data based on the stored plurality of events. For example, network traffic destinations are stored, in an embodiment, to perform anomaly detection, i.e., to detect network traffic destinations which are anomalous.

At S620, a security graph is traversed to detect a cybersecurity threat. In an embodiment, an instruction is generated which, when executed by a graph database, configures a database management system to execute a query for detecting a node in a security graph stored on the graph database. In certain embodiments, the detected node represents a resource on which a sensor is deployed, the sensor generating the IOC data which is received at S610.

In certain embodiments, a security graph is traversed to detect a node representing a cybersecurity threat corresponding to the IOC and connected to a node representing the resource from which the IOC was generated. For example, a query is generated based on the IOC data and executed on the security graph. In an embodiment, execution of the query returns a result.

At S630, a check is performed to determine if the cybersecurity threat was found. In an embodiment, the check includes receiving a result from a query executed on a security graph, and determining if a node representing a resource is connected to a node representing a cybersecurity threat. If 'yes,' execution continues at S660. If 'no' execution continues at S640.

At S640, a node is generated to represent the IOC in the security graph. In an embodiment, IOC data is stored with the node. In certain embodiments, an identifier of an IOC may be assigned to the IOC data, and the identifier of the IOC is stored with the node in the graph database.

At S650, an edge is generated to connect the node representing the IOC to a node representing the resource. In an embodiment the resource is a resource from which the IOC originated. For example, an edge may be generated to connected the node representing the IOC to the node representing the resource.

At S660, a mitigation action is generated. In an embodiment, generating a mitigation action includes generating an instruction which when executed configures a computing device to initiate the mitigation action. In an embodiment, the mitigation is initiating an inspection of the resource, generating an alert, a combination thereof, and the like. In certain embodiments the alert is generated based on any one of: the IOC data, an identifier of the resource, a predetermined rule, a combination thereof, and the like. In an embodiment, initiating inspection of a resource includes generating an instruction which when executed in a cloud computing environment configures the cloud computing environment to generate an inspectable disk, and provide an inspector workload access to the inspectable disk to inspect the inspectable disk for a cybersecurity threat corresponding to the IOC data.

Figure 7:
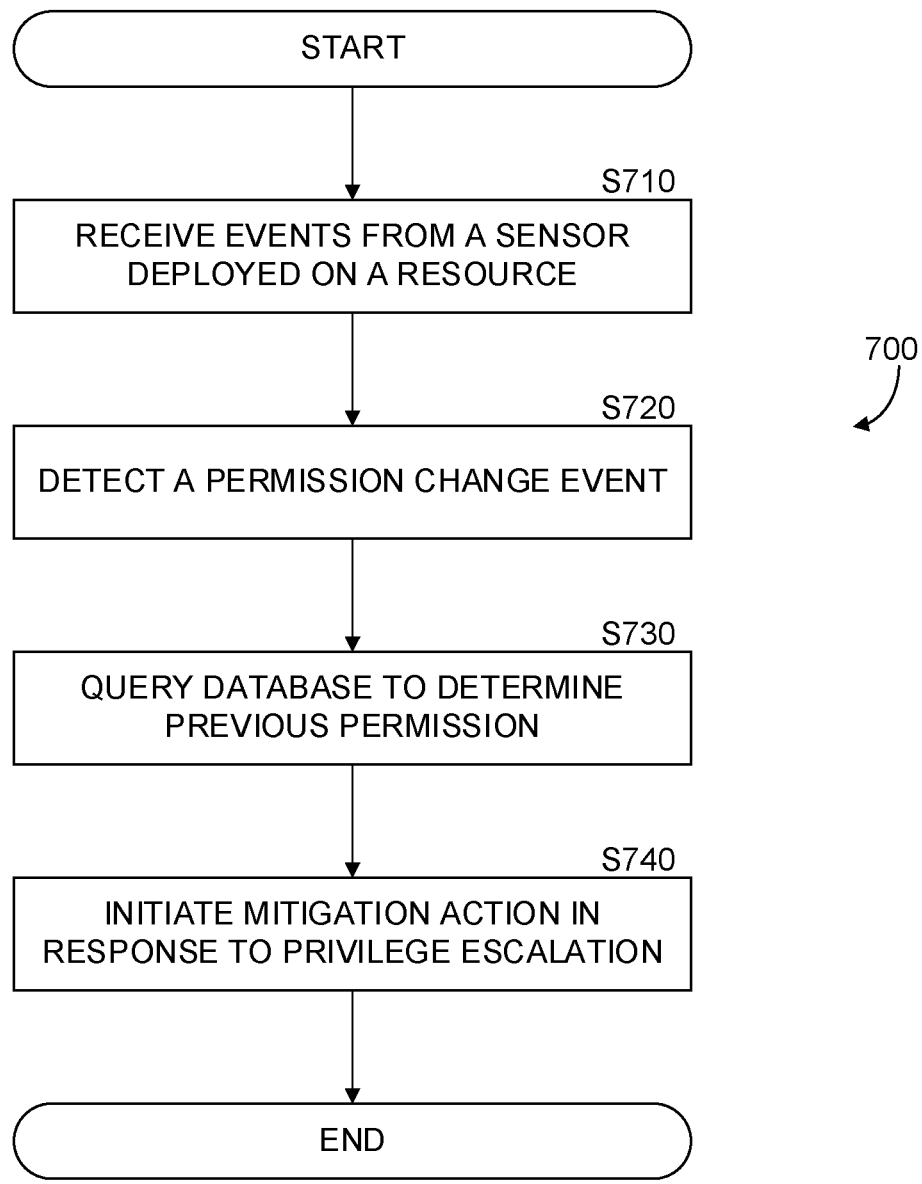
FIG. 7 is a flowchart of a method for detecting privilege escalation utilizing a sensor deployed on a resource, implemented in accordance with an embodiment.

FIG. 7 is an example flowchart of a method for detecting privilege escalation utilizing a sensor deployed on a resource, implemented in accordance with an embodiment. In some embodiments, certain principals, actors, and the like, include a first set of permissions, authorizations, and the like, at a first point in time, and include a second set of permissions, authorizations, and the like, at a second point in time. Where an actor, such as a process, a process in a container, and the like, has additional permissions, permissions which allow the actor to perform additional actions, and the like, at the second point in time, this is an indication of privilege escalation, according to an embodiment.

In some embodiments, an actor is represented as a node in a security graph, such as the security graph stored on graph database 126 of FIG. 1 above. In certain embodiments, privileges, authorizations, permissions, and the like, are stored on the security graph, for example in the node representing the actor.

At S710, a plurality of events is received from a sensor deployed on a resource. In an embodiment, the resource is deployed in a cloud computing environment. For example, the resource is a software container node, including a plurality of pods. In an embodiment, the plurality of events is received by a sensor backend server configured to receive such events from a sensor deployed on a resource in a computing environment, such as a cloud computing environment.

In some embodiments, a sensor is configured to detect a plurality of events occurring on a virtual machine, a software container node, a serverless function, and the like, and transmit a portion of the plurality of events to the sensor backend server. This is advantageous as it reduces the amount of network bandwidth utilized in communication between the sensor and the sensor backend server.

In an embodiment, an event of the plurality of events is a permission-based event. In some embodiments, a permission based event includes an event which indicates generating a new user, updating permissions of an existing user, generating a new process, updating permissions of an existing process, and the like. For example, in an embodiment, the process is a process which is deployed on the resource.

In certain embodiments, events are requested from the sensor, for example based on detecting a vulnerability, exposure, misconfiguration, and the like, on the resource on which the sensor is deployed. In some embodiments, the sensor is configured to send certain types of events based on a detected vulnerability, exposure, misconfiguration, and the like. This is advantageous as only events which are indicative of exploitation of a particular cybersecurity threat are transmitted to the sensor backend server, thereby decreasing network utilization in the communication between the sensor and the sensor backend server. Furthermore, the number of events required to be processed by the sensor backend server is decreased, thereby reducing the processing requirements of the sensor backend server.

At S720, a permission event is detected. In an embodiment, the permission-based event is detected in the plurality of received events. In some embodiments, the permission based event includes an event which indicates generating a new user, updating permissions of an existing user, generating a new process, updating permissions of an existing process, a combination thereof, and the like.

For example, according to an embodiment, an event includes generating a new actor, new principal, and the like, based on an instruction received from a parent actor, parent principal, and the like. In certain embodiments, the parent actor includes a first set of permissions, and the new actor (i.e., the child actor) includes a second set of permissions. Where the second set of permissions includes permissions which are not included in the first set of permissions, this is an indication of privilege escalation, according to an embodiment.

In certain embodiments, the event includes an identifier of a permission, such as an identifier of a role (e.g., administrator role). In some embodiments, the event includes an identifier of a policy, for example in an event generating an exception to a policy for a particular actor. An exception to a policy allows, according to an embodiment, increased privilege when compared to a similar actor for which the exception does not apply.

At S730, a previous permission is determined. In an embodiment, determining a previous permission includes querying a database, such as a security database, which includes thereon a representation of actors and their corresponding permissions, privileges, authorizations, policies, exceptions, combinations thereof, and the like.

In some embodiments, querying a database includes traversing a security graph to detect a node which represents the actor identified in the event. In certain embodiments, querying the database includes detecting a parent actor of a child actor, wherein the child actor is identified in the event. This is advantageous, for example, when comparing privileges accorded to a parent actor versus privileges accord to the child actor. Where, for example, a child actor includes privileges which are higher than the parent actor, a privilege escalation event is detected.

In yet other embodiments, an identity and access management (IAM) service are queried to determine a previous permission of a principal, where data of the principal is stored on a storage of the IAM service. For example, data of the principal is, according to an embodiment, a user identifier, a user account identifier, an email address, a password, a hash of a password, a role, a domain, a combination thereof, and the like.

Where a privilege escalation event is detected, it is advantageous to initiate a mitigation action. This reduces the amount of time a malicious entity can utilize an unauthorized actor, and thereby minimizes damage to the computing environment, the resource, and the like. For example, the sooner an unauthorized actor is identifier acting on a virtual machine in a cloud computing environment, the less data the unauthorized actor is able to steal, corrupt, and the like.

At S740, a mitigation action is initiated. In an embodiment, the mitigation action is initiated in response to detecting the permission-based event. In some embodiments, the mitigation action includes generating an alert, assigning a severity score to an alert (e.g., low, moderate, severe, critical), modifying a severity score of an alert, generating a ticket, and the like. In certain embodiment, the mitigation action further includes generating a severity score for the ticket, modifying a severity score of the ticket, a combination thereof, and the like.

In an embodiment, generating a mitigation action includes generating an instruction which when executed configures a computing device to initiate the mitigation action. In an embodiment, the mitigation includes initiating an inspection of the resource, generating an alert, a combination thereof, and the like.

In certain embodiments the alert is generated based on any one of: an identifier of the resource, an identifier of an actor, an identifier of a parent actor, an identifier of a privilege, an identifier of a role, an identifier of a policy, an identifier of a policy exception, a combination thereof, and the like.

In an embodiment, initiating inspection of a resource includes generating an instruction which when executed in a cloud computing environment configures the cloud computing environment to generate an inspectable disk, and provide an inspector workload access to the inspectable disk to inspect the inspectable disk for a cybersecurity threat corresponding to the privilege escalation. In some embodiments, in response to detecting a privilege escalation, the sensor of the resource is configured to detect additional events, detect additional event types, transmit additional events, transmit additional event types, a combination thereof, and the like.

In some embodiments, the sensor is assigned a memory portion of a workload on which it is deployed. In certain embodiments, the memory portion is utilized by the sensor as a buffer, including events stored in the buffer. In certain embodiments, the mitigation action includes sending the contents of the buffer, a portion of the contents of the buffer, and the like, for example to the sensor backend server.

For example, according to an embodiment, in response to detecting a permission-based event (e.g., a privilege escalation), the sensor is configured to transmit events which indicate that the resource is communicating with another computing device, for example a computing device which is outside of the cloud computing environment of the resource. This indicates, according to an embodiment, that an unauthorized actor is acting on the resource and configuring the resource to transmit data therefrom.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting privilege escalation on a resource deployed in a computing environment, comprising:
configuring the resource to deploy thereon a sensor, the sensor configured to listen on a data link layer of the resource for an event;
receiving from the sensor a permission-based event based on a first actor, the permission-based event indicating a first permission set of the first actor;
querying a database to detect a second permission set of the first actor;
detecting that the first permission set includes a permission which is not in the second permission set;
determining that the resource is involved in a privilege escalation event in response to detecting that the first permission set includes a permission which is not in the second permission set;
configuring the sensor to transmit an event of a second type, in response to determining the privilege escalation event;
receiving an event of the second type;
determining that the resource is a compromised resource in response to receiving the event of the second type; and
initiating a mitigation action in response to the determined privilege escalation event.

2. The method of claim 1, further comprising:
detecting in the database a parent actor of the first actor, wherein the parent actor is associated with a third permission set; and
determining that the resource is involved in a privilege escalation event in response to detecting that the first permission set includes a permission which is not in the third permission set.

3. The method of claim 1, further comprising:
configuring the sensor to perform any one of: detect an additional event, detect an additional event type, transmit an additional event, transmit an additional event type, and any combination thereof.

4. The method of claim 1, further comprising:
detecting an event indicating generation of the first actor in the resource.

5. The method of claim 1, further comprising:
generating an instruction to inspect the resource for a cybersecurity object.

6. The method of claim 1, wherein the mitigation action includes any one of: generating an alert, assigning a severity score to an alert, modifying a severity score of an alert, and any combination thereof.

7. The method of claim 1, wherein the permission-based event includes any one of: an event which indicates generating a new actor, an event indicating updating permissions of an existing actor, an event indicating generating a new process, an event indicating updating permissions of an existing process, and any combination thereof.

8. A non-transitory computer-readable medium storing a set of instructions for detecting privilege escalation on a resource deployed in a computing environment, the set of instructions comprising:
one or more instructions that, when executed by one or more processors of a device, cause the device to:

configure the resource to deploy thereon a sensor, the sensor configured to listen on a data link layer of the resource for an event;

receive from the sensor a permission-based event based on a first actor, the permission-based event indicating a first permission set of the first actor;

query a database to detect a second permission set of the first actor;

detect that the first permission set includes a permission which is not in the second permission set;

determine that the resource is involved in a privilege escalation event in response to detecting that the first permission set includes a permission which is not in the second permission set;

configure the sensor to transmit an event of a second type, in response to determining the privilege escalation event;

receive an event of the second type;

determine that the resource is a compromised resource in response to receiving the event of the second type; and initiate a mitigation action in response to the determined privilege escalation event.

9. A system for detecting privilege escalation on a resource deployed in a computing environment comprising:
a processing circuitry; and
a memory, the memory containing instructions that, when executed by the processing circuitry, configure the system to:
configure the resource to deploy thereon a sensor, the sensor configured to listen on a data link layer of the resource for an event;
receive from the sensor a permission-based event based on a first actor, the permission-based event indicating a first permission set of the first actor;
query a database to detect a second permission set of the first actor;
detect that the first permission set includes a permission which is not in the second permission set;
determine that the resource is involved in a privilege escalation event in response to detecting that the first permission set includes a permission which is not in the second permission set;
configure the sensor to transmit an event of a second type, in response to determining the privilege escalation event;
receive an event of the second type;
determine that the resource is a compromised resource in response to receiving the event of the second type; and
initiate a mitigation action in response to the determined privilege escalation event.

10. The system of claim 9, wherein the memory contains further instructions which when executed by the processing circuitry further configure the system to:
detect in the database a parent actor of the first actor, wherein the parent actor is associated with a third permission set; and
determine that the resource is involved in a privilege escalation event in response to detecting that the first permission set includes a permission which is not in the third permission set.

11. The system of claim 9, wherein the memory contains further instructions which when executed by the processing circuitry further configure the system to: configure the sensor to perform any one of: detect an additional event, detect an additional event type, transmit an additional event, transmit an additional event type, and any combination thereof.

12. The system of claim 9, wherein the memory contains further instructions which when executed by the processing circuitry further configure the system to:
detect an event indicating generation of the first actor in the resource.

13. The system of claim 9, wherein the memory contains further instructions which when executed by the processing circuitry further configure the system to:
generate an instruction to inspect the resource for a cybersecurity object.

14. The system of claim 9, wherein the mitigation action includes any one of:
generating an alert, assigning a severity score to an alert, modifying a severity score of an alert, and any combination thereof.

15. The system of claim 9, wherein the permission-based event includes any one of:
an event which indicates generating a new actor, an event indicating updating permissions of an existing actor, an event indicating generating a new process, an event indicating updating permissions of an existing process, and any combination thereof.

* * * * *